(12) United States Patent
Shoens

(10) Patent No.: US 7,836,029 B2
(45) Date of Patent: *Nov. 16, 2010

(54) SYSTEMS AND METHODS OF SEARCHING FOR AND DETERMINING MODIFIED BLOCKS IN A FILE SYSTEM

(75) Inventor: Kurt Alan Shoens, Los Altos, CA (US)

(73) Assignee: Pillar Data Systems, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/586,682

(22) Filed: Sep. 25, 2009

(65) Prior Publication Data
US 2010/0179959 A1   Jul. 15, 2010

Related U.S. Application Data

(63) Continuation-in-part of application No. 12/154,494, filed on May 23, 2008, now Pat. No. 7,756,844, which is a continuation-in-part of application No. 11/407,491, filed on Apr. 19, 2006, now Pat. No. 7,379,954, which is a continuation-in-part of application No. 11/147,739, filed on Jun. 7, 2005, now Pat. No. 7,257,606, which is a continuation of application No. 10/616,128, filed on Jul. 8, 2003, now Pat. No. 6,959,313.

(51) Int. Cl.
*G06F 17/30* (2006.01)

(52) U.S. Cl. .................. 707/695; 707/638; 707/639; 707/649

(58) Field of Classification Search .......... 707/999.203, 707/695, 649, 797; 711/161–162
See application file for complete search history.

(56) References Cited

U.S. PATENT DOCUMENTS
5,317,731 A   5/1994   Dias et al.
(Continued)

FOREIGN PATENT DOCUMENTS
WO   WO 02/29573 A2   4/2002

OTHER PUBLICATIONS

You et al., Deep Store: An Archival Storage System Architecture, Proceedings of the 21st International Conference on Data Engineering, 2005, IEEE Computer Society.

(Continued)

*Primary Examiner*—Debbie Le
(74) *Attorney, Agent, or Firm*—Robert Moll

(57) ABSTRACT

The invention relates to a method of determining if a block was modified in a file system by comparing the versions of the base snapshot, the delta snapshot, and the space map block entry (b, e). In another aspect, the invention relates to a method of searching for blocks modified in a tree structured file system. The invention relates to methods and systems of snapshot management of a file system in a data storage system. To represent the snapshots, the invention maintains pointers to the root block pointer of each snapshot. When the active file system is modified, this invention avoids overwriting any blocks used by previous snapshots by allocating new blocks for the modified blocks. When the invention needs to put an established block in a new location, it must update a parent block to point to the new location. The update to the parent block may then require allocating a new block for the new parent block and so forth. Parts of the file system not modified since a snapshot remain in place. The amount of space required to represent snapshots scales with the fraction of the file system that users modify. To maintain snapshot integrity, this invention keeps track of the first and last snapshots that use each block in space map blocks spread throughout the file system data space. When users delete snapshots, this invention may use a background process to find blocks no longer used by any snapshot and makes them available for future use.

10 Claims, 31 Drawing Sheets

U.S. PATENT DOCUMENTS

| | | | |
|---|---|---|---|
| 5,664,186 | A | 9/1997 | Bennett et al. |
| 5,819,292 | A | 10/1998 | Hitz et al. |
| 6,038,639 | A | 3/2000 | O'Brien et al. |
| 6,085,298 | A * | 7/2000 | Ohran ..................... 711/162 |
| 6,205,450 | B1 | 3/2001 | Kanome |
| 6,247,099 | B1 | 6/2001 | Skazinski et al. |
| 6,289,356 | B1 | 9/2001 | Hitz |
| 6,311,193 | B1 | 10/2001 | Selkdo |
| 6,484,186 | B1 | 11/2002 | Rungta |
| 6,490,659 | B1 | 12/2002 | McKean et al. |
| 6,636,878 | B1 | 10/2003 | Rudoff |
| 6,636,879 | B1 | 10/2003 | Doucette et al. |
| 6,732,125 | B1 | 5/2004 | Autrey et al. |
| 6,883,074 | B2 | 4/2005 | Lee et al. |
| 6,938,134 | B2 | 8/2005 | Madany |
| 6,959,313 | B2 | 10/2005 | Kapoor et al. |
| 6,978,353 | B2 | 12/2005 | Lee et al. |
| 7,072,916 | B1 | 7/2006 | Lewis et al. |
| 7,111,021 | B1 | 9/2006 | Lewis et al. |
| 7,237,080 | B2 | 6/2007 | Green et al. |
| 7,257,606 | B2 | 8/2007 | Kapoor et al. |
| 7,454,445 | B2 | 11/2008 | Lewis et al. |
| 7,603,391 | B1 * | 10/2009 | Federwisch et al. ............... 1/1 |
| 7,631,018 | B2 * | 12/2009 | Lee et al. ........................ 1/1 |
| 2002/0019923 | A1 | 2/2002 | Reuter et al. |
| 2002/0049718 | A1 | 4/2002 | Kleiman et al. |
| 2002/0083037 | A1 | 6/2002 | Lewis et al. |
| 2002/0091670 | A1 | 7/2002 | Hitz et al. |
| 2002/0133735 | A1 | 9/2002 | McKean et al. |
| 2003/0018878 | A1 | 1/2003 | Dorward et al. |
| 2004/0133602 | A1 | 7/2004 | Kusters et al. |

OTHER PUBLICATIONS

Padala, A Log Structured File System with Snapshots, 2005, pp. 1-14, University of Michigan.

Peterson et al., Ext3cow: A Time-Shifting File System for Regulatory Compliance, 2005, pp. 1-21, vol. 5, No. N, MM 20YY, ACM Transactions on Storage.

Li et al., Secure Untrusted Data Repository (SUNDR), 2004, NYU Department of Computer Science, pp. 1-16.

Hong et al., Duplicate Data Elimination in a SAN File System, 2004, pp. 301-314.

Flouris et al., Clotho: Transparent Data Versioning at the Block I/O Level, 2004, pp. 101-114.

Cates, Robust and Efficient Data Management for a Distributed Hash Table, Masters of Engineering Thesis at MIT, 2003, pp. 1-64, US.

Schmuck et al., GPFS: A Shared-Disk File System for Large Computing Clusters, Proceedings of the Conference on File and Storage Tech., 2002, pp. 231-244, USENIX, Berkeley, CA.

Quinlan et al., Venti: A new Approach to Archival Storage, 2002, only partial copy readily available, Bell Labs, Lucent Technologies.

Chang et al., Myriad: Cost-effective Disaster Tolerance, Compaq Systems Research Center, 2002, pp. 1-13, Palo Alto, CA.

Muthitacharoen et al., Ivy: A Read/Write Peer-to-Peer File System, 5th Symposium on Operating Systems Design and Implementation, 2002, pp. 31-44, USENIX Association.

Santry et al., Deciding When to Forget in the Elephant File System, Operating Systems Review, 1999, pp. 110-123, 34(5): ACM, Kiawah Island, SC.

Samet, Spatial Data Structures, Modern Database Systems: The Object Model, Interoperability, and Beyond, 1995, pp. 361-385, Addison Wesley/ACM Press Reading, MA.

Kawaguchi et al., A Flash-Memory Based File System, 1995, Advanced Research Laboratory, Hitachi, Ltd.

Hartman et al., The Zebra Striped Network File System, Dissertation at UC Berkeley, 1994, pp. i-48, Berkeley, CA.

Hitz et al., File System Design for an NFS File Server Appliance, 1995, The USENIX Association, pp. 1-23, Mountain View, CA.

Jonge et al., The Logical Disk: A New Approach to Improving File Systems, 1994.

Seltzer et al., An Implementation of a Log-Structured File System for UNIX, 1993, Winter USENIX, pp. 201-220, San Diego, CA.

Quinlan, A Cached WORM File System, Software Practice and Experience, 1991, pp. 1289-1299, vol. 21(12), John Wiley & Sons, Ltd.

Nelson et al., Caching in the Sprite Network File System, 1988, pp. 134-154, vol. 6, No. 1, ACM Transactions on Computer Systems.

Sandberg et al., Design and Implementation of the Sun Network Filesystem, 1985, Sun Microsystems, Inc., Mountain View, CA.

Ousterhout et al., A Trace-Driven Analysis of the UNIX 4.2 BSD File System, 1985, pp. 15-24, Association for Computing Machinery (ACM).

U.S. Appl. No. 60/419,252, filed Jul. 8, 2004, Kusters et al.

McKusick, Joy, Leffler, and Fabry, A Fast File System for UNIX, ACM Transactions on Computer Systems, Aug. 1984, pp. 181-197, vol. 2, No. 3, US.

McKusick and Ganger, Soft Updates: A Technique for Eliminating Most Synchronous Writes in the Fast Filesystem, Proceedings of the FREENIX Track: 1999 USENIX Annual Technical Conference, Jun. 6-11, 1999, pp. 1-18, Monterey, US.

Rosenblum and Ousterhout, The Design and Implementation of a Log-Structured File System, ACM Transactions on Computer Systems, Feb. 1992, pp. 26-52, vol. 10, No. 1, Berkeley, US.

Rosenberg, Dearle, Hulse, Lindstrom and Norris, Operating System Support for Persistant and Recoverable Computations, Communications of the ACM, Sep. 1996, pp. 62-69, vol. 38, No. 9, US.

Lee and Thekkath, Petal: Distributed Virtual Disks, copyrighted 1996, pp. 84-92, ACM, Inc. MA, US.

Thekkath, Mann, and Lee, Frangipani: A Scalable Distributed File System, copyrighted1997, pp. 224-237, ACM, Inc. Saint-Malo, France.

European Exam Report for European Patent Application No. EP 04756637, Dated Mar. 26, 2007.

Supplementary European Search Report for European Patent Application No. EP 04756637, Published Jan. 1, 2007.

PCT International Search Report for International Application No. PCT/US04/21476, Published May 10, 2005.

European Exam Report for European Patent Application No. EP 04756637, Dated Mar. 28, 2008.

* cited by examiner

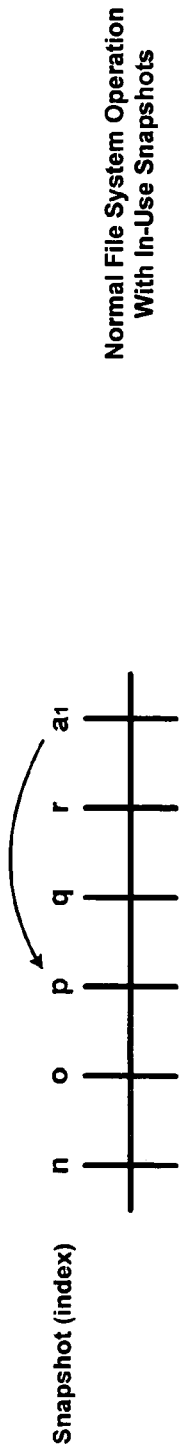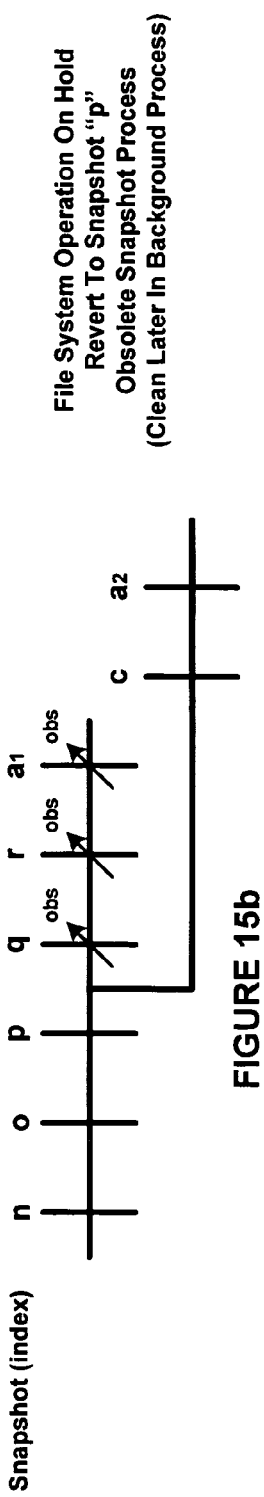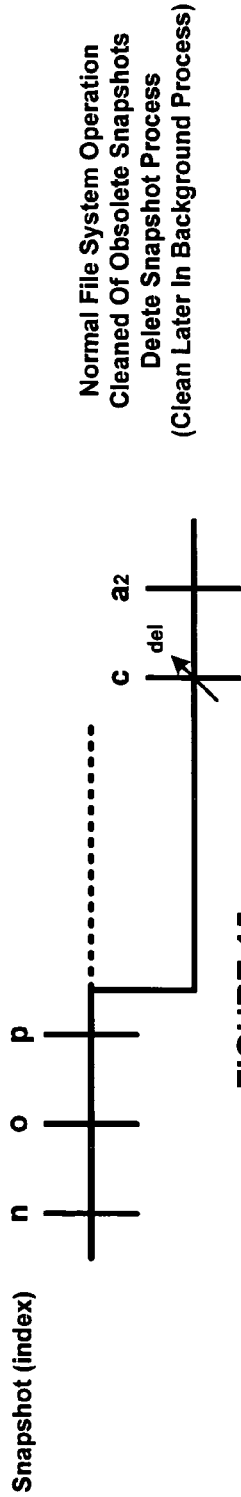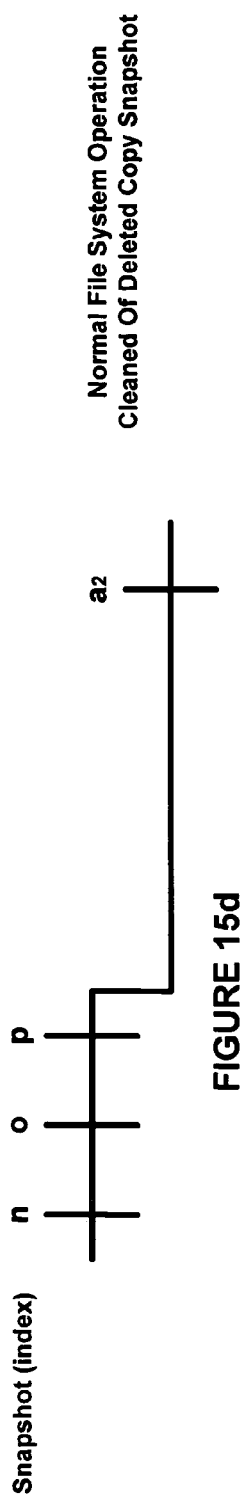

Multiple File System Reversions
To Snapshot "p" And To Snapshot "s"
Prior To Completing Background Cleaning Process

| Image Name | Timestamp | Freeable Space (GB) |
|---|---|---|
| ☐ Daily 1 | 04/06/2006 | 0 |
| ☐ Daily 2 | 04/08/2006 | 0 |
| ☐ Daily 3 | 04/10/2006 | 0 |
| ☐ Daily 4 | 04/12/2006 | 0 |
| ☒ Weekly 1 | 04/02/2006 | 1150 |
| ☐ Weekly 2 | 04/09/2006 | 0 |
| ☐ Monthly 1 | 04/01/2006 | 0 |
| ☐ Monthly 2 | 05/01/2006 | 0 |

Total GB: 1150

[ Delete Snapshots ]   [ Clear Selections ]

FIGURE 17

| Image Name | Timestamp | Freeable Space (GB) | |
|---|---|---|---|
| Daily 1 | 04/06/2006 | 0 | ☐ |
| Daily 2 | 04/08/2006 | 0 | ☐ |
| Daily 3 | 04/10/2006 | 0 | ☐ |
| Daily 4 | 04/12/2006 | 700 | ☒ |
| Weekly 1 | 04/02/2006 | 1300 | ☒ |
| Weekly 2 | 04/09/2006 | 0 | ☐ |
| Monthly 1 | 04/01/2006 | 0 | ☐ |
| Monthly 2 | 05/01/2006 | 0 | ☐ |
| | Total GB | 2000 | |

Delete Snapshots   Clear Selections

FIGURE 18

First Space Map Block: 0 0 0 | 3 1 | 0 0 | 0 0 | 1 0 | 0 0

Second Space Map Block: 0 0 | 2 2 | 0 0 | 0 0 | 3 1 | 0 0 | 0 0

Snapspace Matrix

| e \ b | 0 | 1 | 2 | 3 |
|---|---|---|---|---|
| 0 | 10 | 1 | 0 | 0 |
| 1 | 0 | 0 | 0 | 2 |
| 2 | 0 | 0 | 1 | 0 |
| 3 | 0 | 0 | 0 | 0 |

FIGURE 19

Snapspace Matrix

Process B-tree Leaf Block

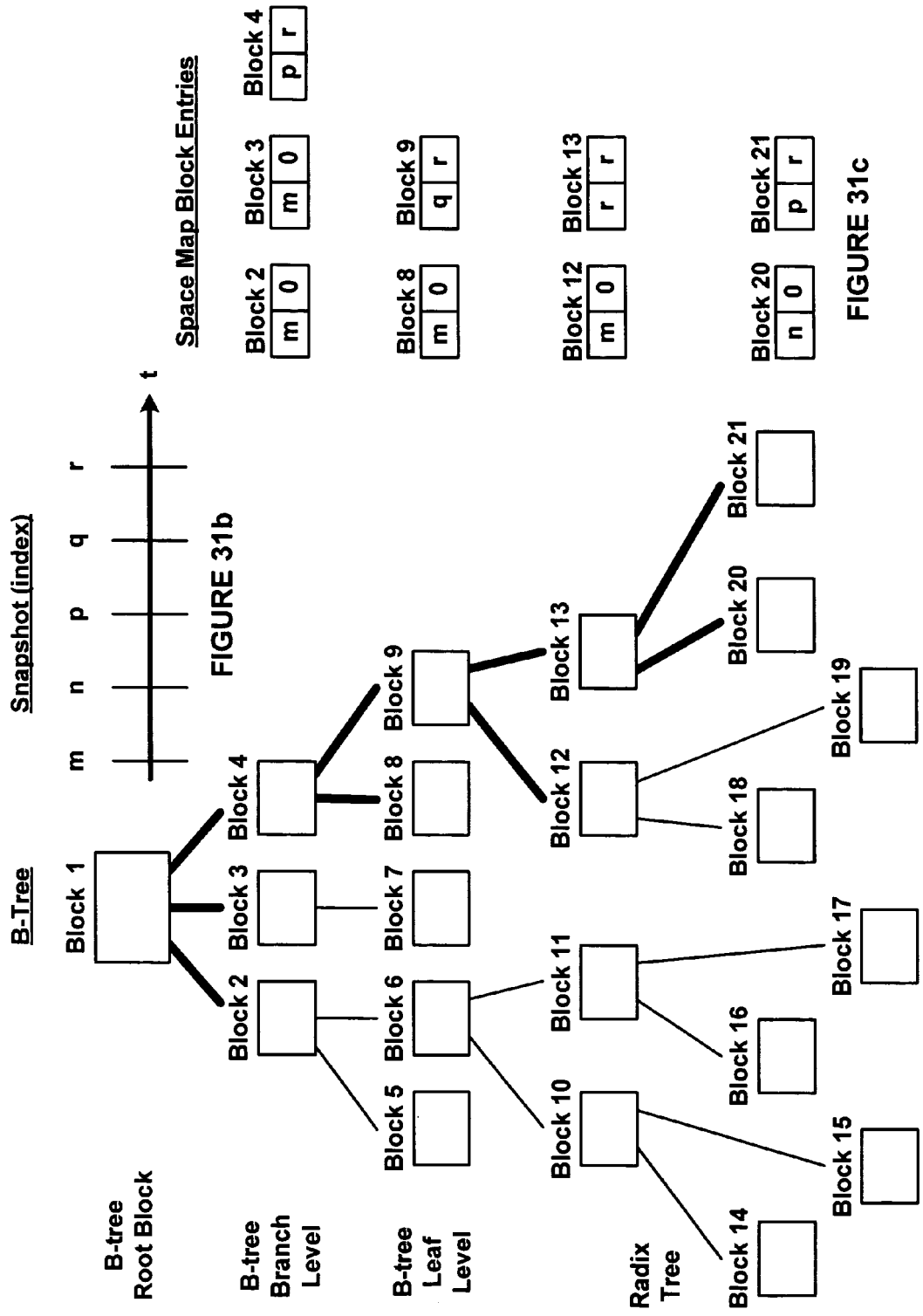

US 7,836,029 B2

SYSTEMS AND METHODS OF SEARCHING FOR AND DETERMINING MODIFIED BLOCKS IN A FILE SYSTEM

This application is a continuation-in-part of U.S. application Ser. No. 12/154,494, Methods of Determining and Searching for Modified Blocks in a File System, filed on May 23, 2008 now U.S. Pat. No. 7,756,844, which is a continuation-in-part of U.S. application Ser. No. 11/407,491, Management of File System Snapshots, filed on Apr. 19, 2006, now U.S. Pat. No. 7,379,954 B2, which is a continuation-in-part of U.S. application Ser. No. 11/147,739, Methods of Snapshot and Block Management in Data Storage Systems, filed on Jun. 7, 2005, now U.S. Pat. No. 7,257,606 B2, which is a continuation of U.S. application Ser. No. 10/616,128, Snapshots of File Systems in Data Storage Systems, filed on Jul. 8, 2003, now U.S. Pat. No. 6,959,313 B2, which are all incorporated by reference herein.

BACKGROUND

The present invention relates to snapshots of file systems in data storage systems.

This application also incorporates by reference herein as follows:

U.S. application Ser. No. 10/264,603, Systems and Methods of Multiple Access Paths to Single Ported Storage Devices, filed on Oct. 3, 2002, now abandoned;

U.S. application Ser. No. 10/354,797, Methods and Systems of Host Caching, filed on Jan. 29, 2003, now U.S. Pat. No. 6,965,979 B2;

U.S. application Ser. No. 10/397,610, Methods and Systems for Management of System Metadata, filed on Mar. 26, 2003, now U.S. Pat. No. 7,216,253 B2;

U.S. application Ser. No. 10/440,347, Methods and Systems of Cache Memory Management and Snapshot Operations, filed on May 16, 2003, now U.S. Pat. No. 7,124,243 B2;

U.S. application Ser. No. 10/600,417, Systems and Methods of Data Migration in Snapshot Operations, filed on Jun. 19, 2003, now U.S. Pat. No. 7,136,974 B2;

U.S. application Ser. No. 10/677,560, Systems and Methods of Multiple Access Paths to Single Ported Storage Devices, filed on Oct. 1, 2003, now abandoned;

U.S. application Ser. No. 10/696,327, Data Replication in Data Storage Systems, filed on Oct. 28, 2003, now U.S. Pat. No. 7,143,122 B2;

U.S. application Ser. No. 10/837,322, Guided Configuration of Data Storage Systems, filed on Apr. 30, 2004, now U.S. Pat. No. 7,216,192 B2;

U.S. application Ser. No. 10/975,290, Staggered Writing for Data Storage Systems, filed on Oct. 27, 2004, now U.S. Pat. No. 7,380,157 B2;

U.S. application Ser. No. 10/976,430, Management of I/O Operations in Data Storage Systems, filed on Oct. 29, 2004, now U.S. Pat. No. 7,222,223 B2;

U.S. application Ser. No. 11/122,495, Quality of Service for Data Storage Volumes, filed on May 4, 2005, now U.S. Pat. No. 7,418,531 B2;

U.S. application Ser. No. 11/245,718, A Multiple Quality of Service File System, filed on Oct. 8, 2005, now abandoned; and U.S. application Ser. No. 11/408,209, Methods and Systems of Cache Memory Management and Snapshot Operations, filed on Apr. 19, 2006, now U.S. Pat. No. 7,380,059 B2.

Files exist to store information on storage devices (e.g., magnetic disks) and allow the information to be retrieved later. A file system is a collection of files and directories plus operations on them. To keep track of files, file systems have directories. A directory entry provides the information needed to find the blocks associated with a given file. Many file systems today are organized in a general hierarchy (i.e., a tree of directories) because it gives users the ability to organize their files by creating subdirectories. Each file may be specified by giving the absolute path name from the root directory to the file. Every file system contains file attributes such as each file owner and creation time and must be stored somewhere such as in a directory entry.

A snapshot of a file system will capture the content (i.e., files and directories) at an instant in time. A snapshot results in two data images: (1) the active data that an application can read and write as soon as the snapshot is created and (2) the snapshot data. Snapshots can be taken periodically, hourly, daily, or weekly or on user demand. They are useful for a variety of applications including recovery of earlier versions of a file following an unintended deletion or modification, backup, data mining, or testing of software.

The need for high data availability often requires frequent snapshots that consume resources such as memory, internal memory bandwidth, storage device capacity and the storage device bandwidth. Some important issues for snapshots of file systems is how to manage the allocation of space in the storage devices, how to keep track of the blocks of a given file, and how to make snapshots of file systems work efficiently and reliably.

SUMMARY OF THE INVENTION

The invention provides methods and systems for management of snapshots of a file system. In a first aspect of the invention, a snapshot management system performs a method for managing multiple snapshots and an active file system by (a) maintaining an index table that contains an entry for each snapshot and the active file system; and (b) maintaining space map block entry (b, e) where b and e represent index table entries, b indicates a first snapshot that uses the first block and e indicates a last snapshot that uses the first block.

In a second aspect of the invention, a snapshot management system, including a processor, for maintaining multiple snapshot versions and an active file system, comprises: (a) an index table that contains an entry for each snapshot and the active file system; (b) a space map block including space map block entry (b, e), wherein b and e represent index table entries, b indicates a first snapshot that uses the first block, and e indicates a last snapshot that uses the first block; and (c) a usable space for storing the snapshot versions and the active file system.

In another aspect of the invention, a method of snapshot management maintains multiple snapshot versions and an active file system, comprising: (a) maintaining a space map block entry (b, e), wherein b and e represent index table entries, b indicates a first snapshot that uses a first block, and e indicates a last snapshot that uses the first block; and (b) maintaining a snapspace matrix that counts the occurrences of (b, e) for every space map block entry.

In another aspect of the invention, a snapshot management system, including a processor, for maintaining multiple snapshot versions and an active file system, comprises an index table that contains an entry for each snapshot and the active file system, a space map block entry (b, e), wherein b and e represent index table entries, b indicates a first snapshot that uses the first block, and e indicates a last snapshot that uses the first block and a usable space for storing the snapshot versions and the active file system.

In another aspect of the invention, a method determines if a block was modified in a file system by comparing the versions of the base snapshot, the delta snapshot and the space map block entry (b, e).

In another aspect of the invention, a primary data storage maintains a base snapshot of an active file system that represents the contents of a file system of a secondary data storage system. To bring the secondary file system up-to-date after modifications to the blocks of the primary file system, the primary data storage system periodically (e.g., hourly or daily or weekly) takes a delta snapshot, examines space map block entries of the file system to identify the modified blocks between the base snapshot and the delta snapshot, and transmits the modified blocks to the secondary data storage system.

In another aspect of the invention, a method searches for modified blocks in a tree structured file system.

BRIEF DESCRIPTION OF THE DRAWINGS

FIG. 15a illustrates a diagram of an active file system with a request to revert to an earlier snapshot.

FIG. 15b illustrates a diagram of an active file system on hold to obsolete snapshots after the earlier snapshot.

FIG. 15c illustrates a diagram of the cleaning of the obsolete snapshots.

FIG. 15d illustrates a diagram of the file system after reversion to the earlier snapshot.

FIG. 17 illustrates an embodiment of a user interface that permits a user to delete certain snapshots to free storage space.

FIG. 18 illustrates an embodiment of the user interface with an additional snapshot selected for deletion.

FIG. 19 illustrates the snapspace matrix and values of each index entry [b, e].

FIGS. 31a-31c illustrate a method of traversing B-tree and Radix tree data structures to find modified blocks in a file system.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
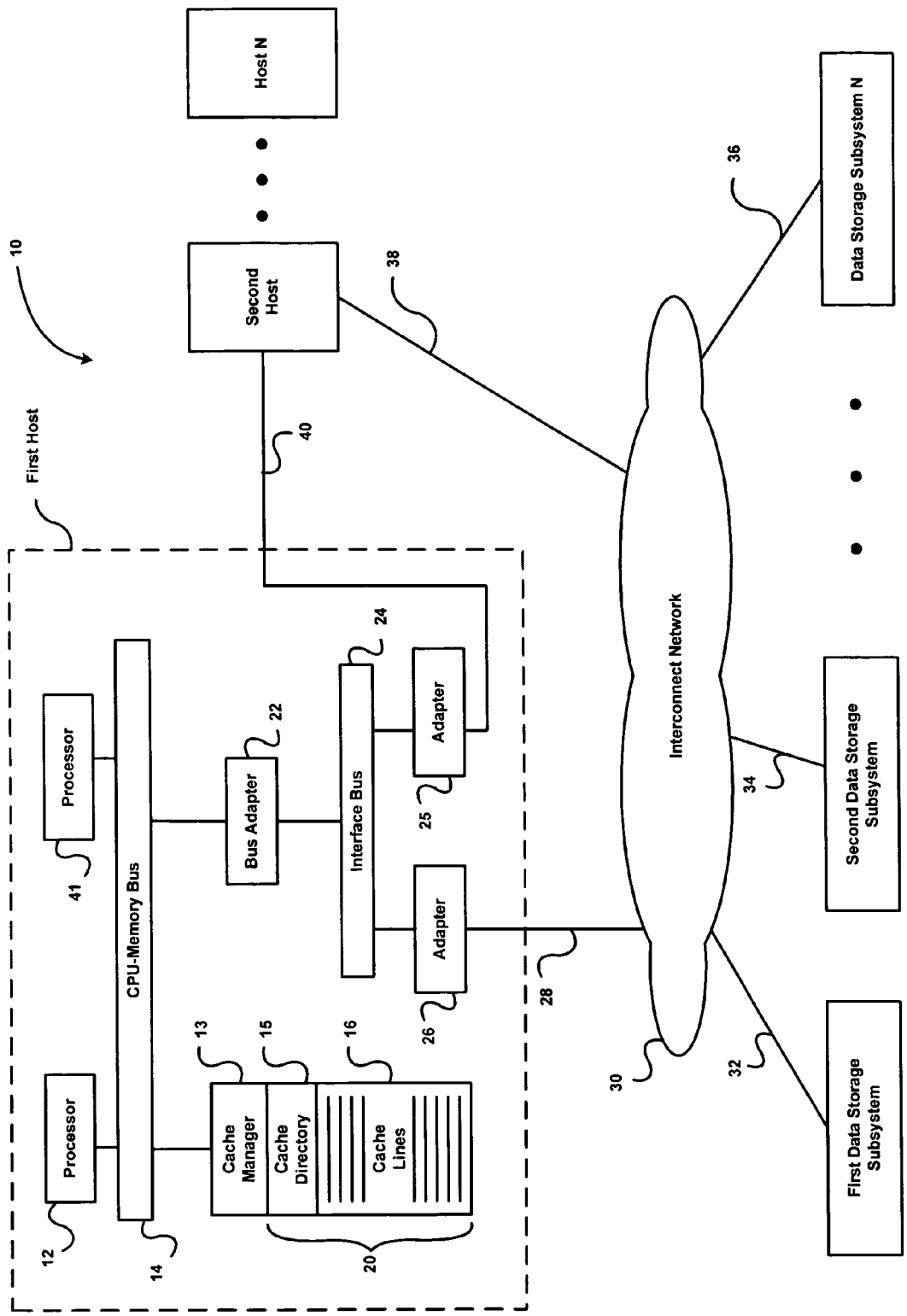
FIG. 1 illustrates an embodiment of a data storage system.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Ethernet, Fibre Channel, ATM, and SCSI, and InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, the first host includes a motherboard with a CPU-memory bus 14 that communicates with dual processors 12 and 41. The processor used is not essential to the invention and could be any suitable processor such as the Intel Pentium 4 processor. A processor could be any suitable general purpose processor running software, an ASIC dedicated to perform the operations described herein or a field programmable gate array (FPGA). Also, one could implement the invention using a single processor in each host or more than two processors to meet more stringent performance requirements. The arrangement of the processors is not essential to the invention.

The first host cache memory 20 includes a cache manager 13, a cache directory 15, and cache lines 16. The cache memory 20 is nonvolatile memory or volatile memory or a combination of both. Nonvolatile memory protects data in the event of a power interruption or a host failure. Data is defined as including user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

A computer-readable medium (e.g., storage device, CD, DVD, floppy card, USB storage device) can be used to encode the software program instructions described in the methods below.

Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests, but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *IP SANs: A Guide to iSCSI, iFCP, and FCIP Protocols for Storage Area Networks* (2002) and Clark, Designing Storage Area Networks (1999) are incorporated herein by reference.

In an embodiment, the data storage subsystems shown in FIG. 1 can be those described in the co-pending U.S. patent application Ser. No. 10/264,603, entitled, *Systems and Methods of Multiple Access Paths to Single Ported Storage Devices*, filed on Oct. 3, 2002, and incorporated herein by reference. It is understood, however, that other storage device(s) or data storage subsystems could be used instead of the data storage subsystem described in that U.S. patent application.

As shown in FIG. 1, the first host connects, or couples, to the first data storage subsystem through the bus adapter 22, the interface bus 24, the adapter 26, the link 28, the interconnection network 30, and the link 32. To connect to the second data storage subsystem, the first host uses the same I/O path except the data passes through link 34, while the second host uses the same type of I/O path plus link 32 to communicate with the first data storage subsystem, or link 34 to communicate with the second data storage subsystem, or link 36 to the data storage subsystem N.

Figure 2:
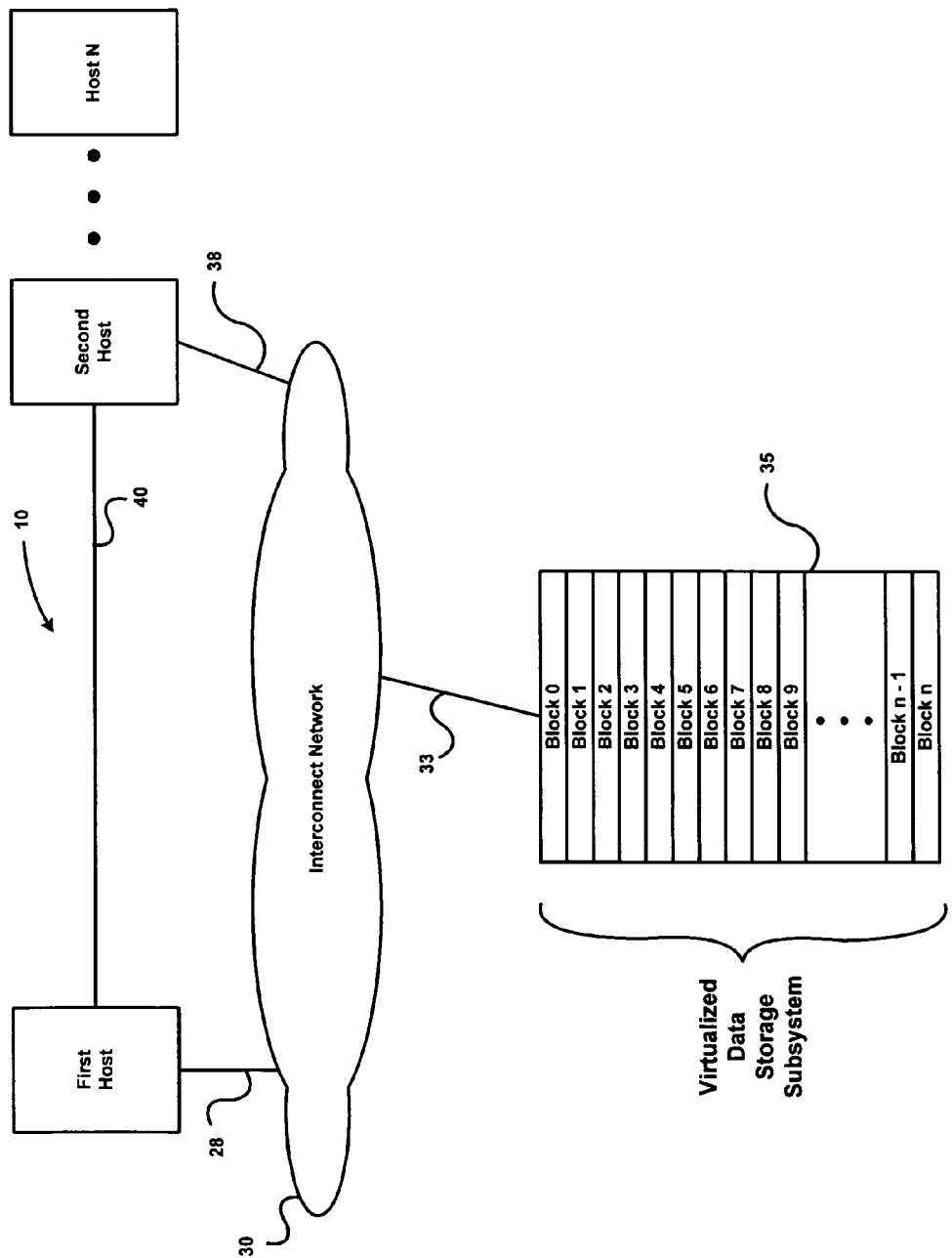
FIG. 2 illustrates the data storage as a virtualized storage subsystem.

FIG. 2 illustrates that each host of the data storage system can store and retrieve files from a data storage subsystem 35 using an interconnect 28, an interconnect 33, and an interconnect network 30. In an embodiment, each storage device in the data storage subsystem is assigned a logical unit number (LUN) that is an identifier for the storage device. A virtual logical unit number (VLUN) is as an abstraction of the storage device(s) or the virtualization of the data storage subsystems such as a linear array of blocks as it appears to the data storage system users. In various embodiments, the implementation of a VLUN may be striped (i.e., spread) over multiple RAID groups for added performance, spread over sections of a RAID group for flexibility, or copied on multiple RAID groups for reliability. As shown, the storage devices of the data storage subsystem are virtualized as a file system employing contiguous fixed sized blocks 0-n where the size of each block is some value preferably 1-KB to 64-KB.

Figure 3:
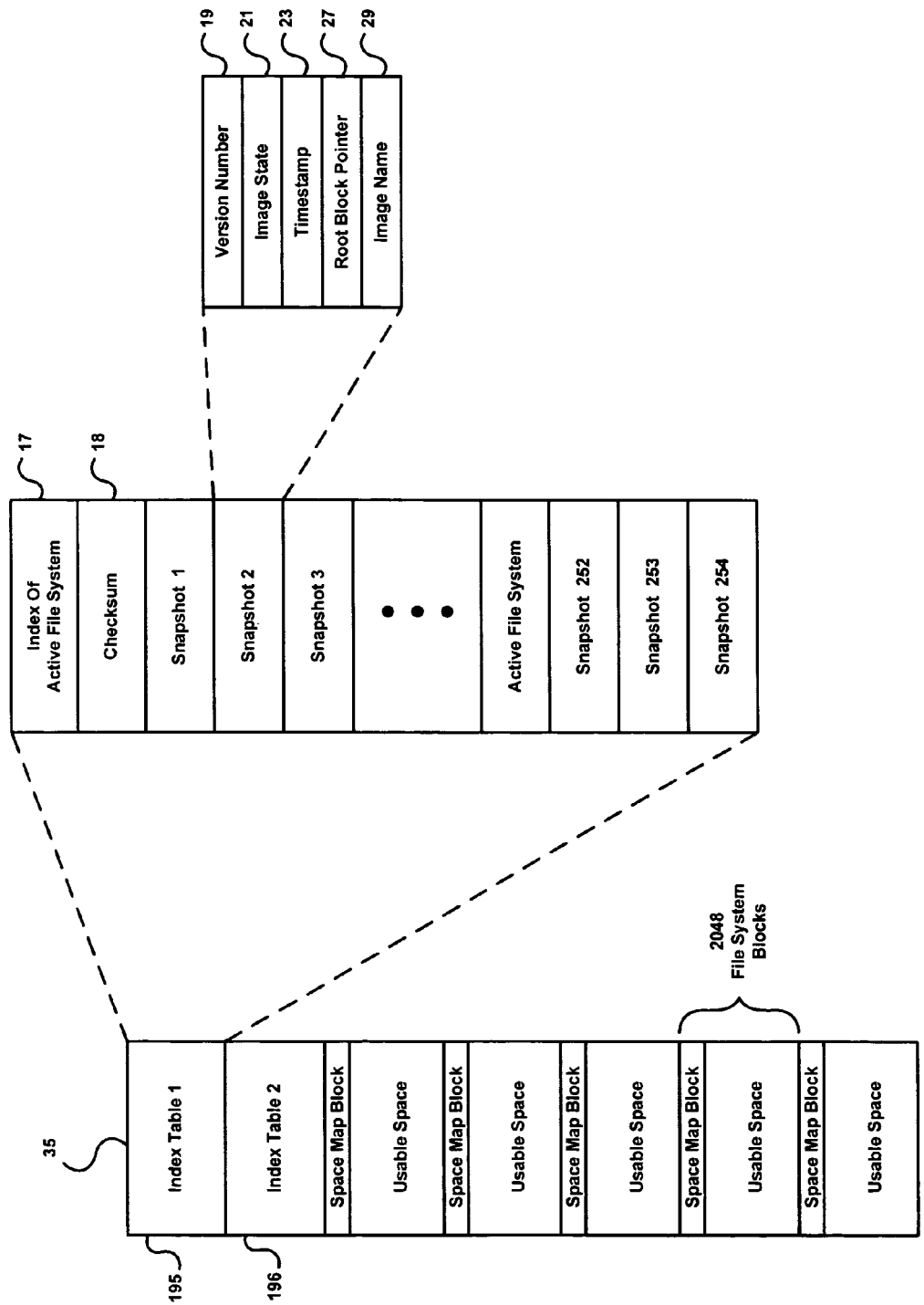
FIG. 3 illustrates details of the virtualized data storage subsystem organized into file system blocks including, snapshot tables, space map blocks, and usable file system data space.

FIG. 3 illustrates a data storage subsystem for maintaining (e.g., allocating, reading, writing, and deallocating) some blocks for index tables, some for space maps, and others for usable space for data storage. The block(s) allocated to an index table depends on the size of each block and the number of concurrent snapshots supported. For example, three 8-KB blocks may be sufficient space to support an index table of 254 snapshots. As shown, the file system has a pair of index tables 195 and 196 and thus uses six 8-KB blocks so the host can alternate writes to the index tables to ensure recovery in case of a data storage system failure. Thus, if the system fails during a write to one index table, the host can retrieve the unmodified copy of the other index table. While we describe this method of writing to alternate index table copies, other methods, such as write journaling, can be used to protect against system failure during index table writes. The remainder of the storage is allocated to space map blocks with usable space for data storage.

Each index table includes an index value of the active file system 17 permitting fast location of the active file system. The index table includes a known algorithm to verify the data integrity such as a checksum 18, a cyclic redundancy check, or a digital signature. The index table provides an index to the snapshots and the active file system. Each entry in the index table represents a snapshot or the active file system. As illustrated, the index range is 1-255, but this range is not essential to the invention. In various embodiments, each snapshot and the active file system has one or more associated attributes such as a version number 19, timestamp 23 and/or image name 29 to identify the snapshot or active file system, an image state 21, a root block pointer 27 as described below.

Each index table includes an index value of the active file system 17 permitting fast location of the active file system. The index table includes a known algorithm to verify the data integrity such as a checksum 18, a cyclic redundancy check, or a digital signature. The index table provides an index to the snapshots and the active file system. Each entry in the index table represents a snapshot or the active file system. As illustrated, the index range is 1-255, but this range is not essential to the invention. In various embodiments, each snapshot and the active file system has one or more associated attributes such as a version number, timestamp and/or image name to identify the snapshot or active file system, an image state, a root block pointer, and an image name as described below.

When the data storage system takes a snapshot of the file system it assigns the snapshot a unique version number such as a 32-bit unsigned integer that increases monotonically for each subsequent snapshot. The version number is not reused even as snapshots are deleted or made obsolete to the file system.

The image state can be one of the following states:

Active—representing the active file system

In-use snapshot—representing a snapshot that users can access

Free—representing available for writing by a snapshot or active file system

Deleted snapshot—representing a user has deleted the associated snapshot but a cleaner process or thread has not yet removed the space map block entry for this snapshot Obsolete snapshot—representing a user has reverted to an earlier snapshot and the cleaner process or thread has not yet removed the space map block entry for this snapshot In an embodiment, when the data storage system takes a snapshot of the file system, the host provides a timestamp (e.g., time and date) when the snapshot or active data image was created. The root block pointer provides the address of the root block in the hierarchical structure of the snapshot and the image name is a character string used to easily identify the snapshot to users.

Figure 4:
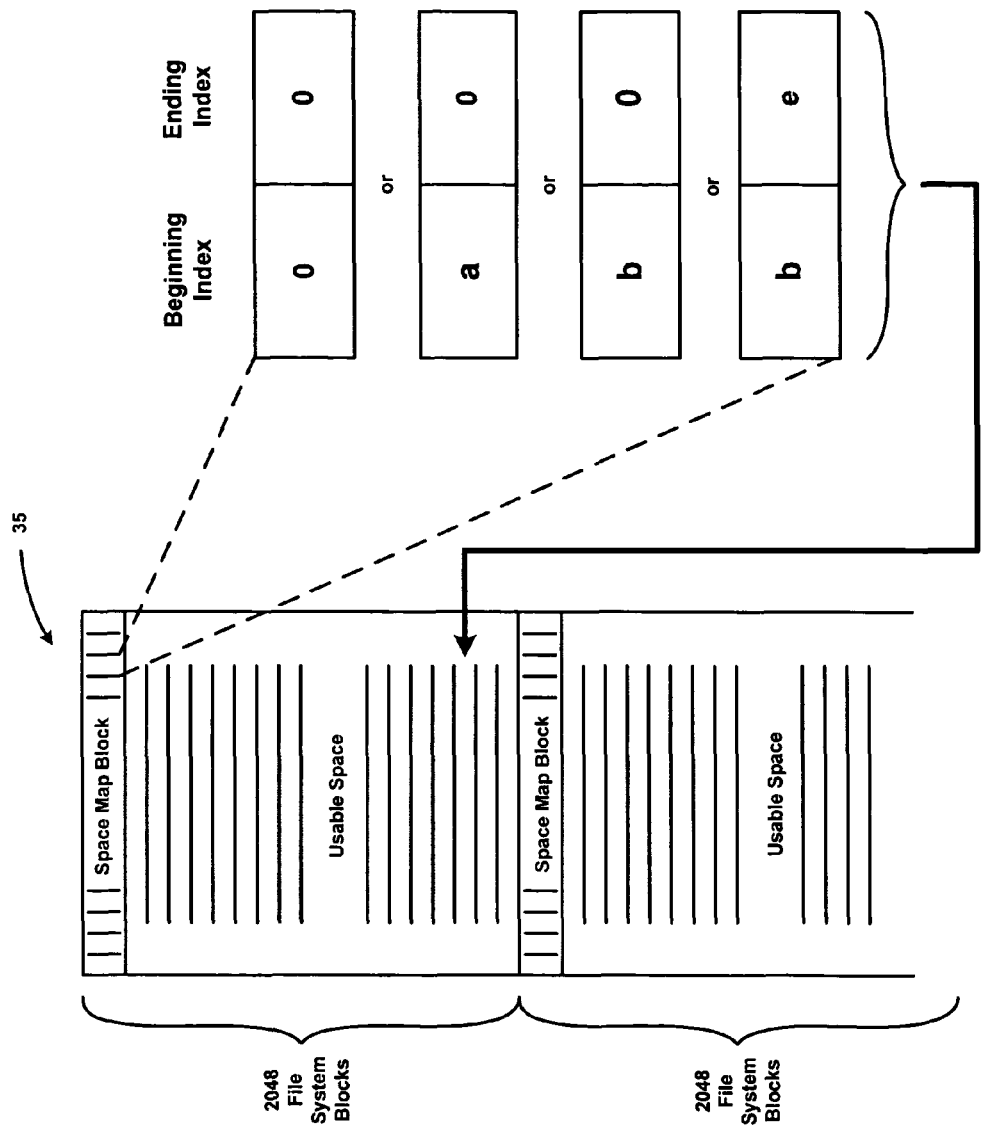
FIG. 4 illustrates details of the space map blocks and a block tracking and index system.

Referring to FIG. 4, the remainder of the data storage subsystem is allocated to space map blocks and usable space for data. Each space map block keeps track of the blocks in its usable space for data storage. For example, a space map block can keep track of 2,047 blocks of usable space. Each space map block entry contains a pair of indexes ("a space map block entry"), for example, 8-bits in length that represent any of 254 snapshots or the active file system. Each space map block entry is an index into the index table shown in FIG. 3. Each space map block entry has a beginning value b that indicates the first snapshot (i.e., snapshot b) and an ending value e that indicates the last snapshot (i.e., snapshot e) to use the associated block. Thus, each space map block entry (b, e) in the space map block is used to track the usage of an associated block in the usable space:

| Beginning Index, b | Ending Index, e | Meaning |
|---|---|---|
| 0 | 0 | The block is free to use by a snapshot or the active file system |
| 8-bit Integer | 0 | The block is in use by one or more snapshots and has not been changed since the first snapshot was taken. The block is also in use by the active file system |
| a | 0 | The block is in use by the active file system only and there are no snapshots associated with the block |
| 8-bit Integer | Another 8-bit Integer | The block is in use by a snapshot and is used by all subsequent snapshots through a last snapshot. The data has changed since the last snapshot was created and is, therefore, no longer in use by the active file system |

In an alternative embodiment, each space map block entry contains a pair of version numbers (e.g., 32-bit) that represent snapshots or the active file system. Thus, each version pair (b, e) in the space map block would be used to track the usage of an associated block in the usable space.

Figure 5:
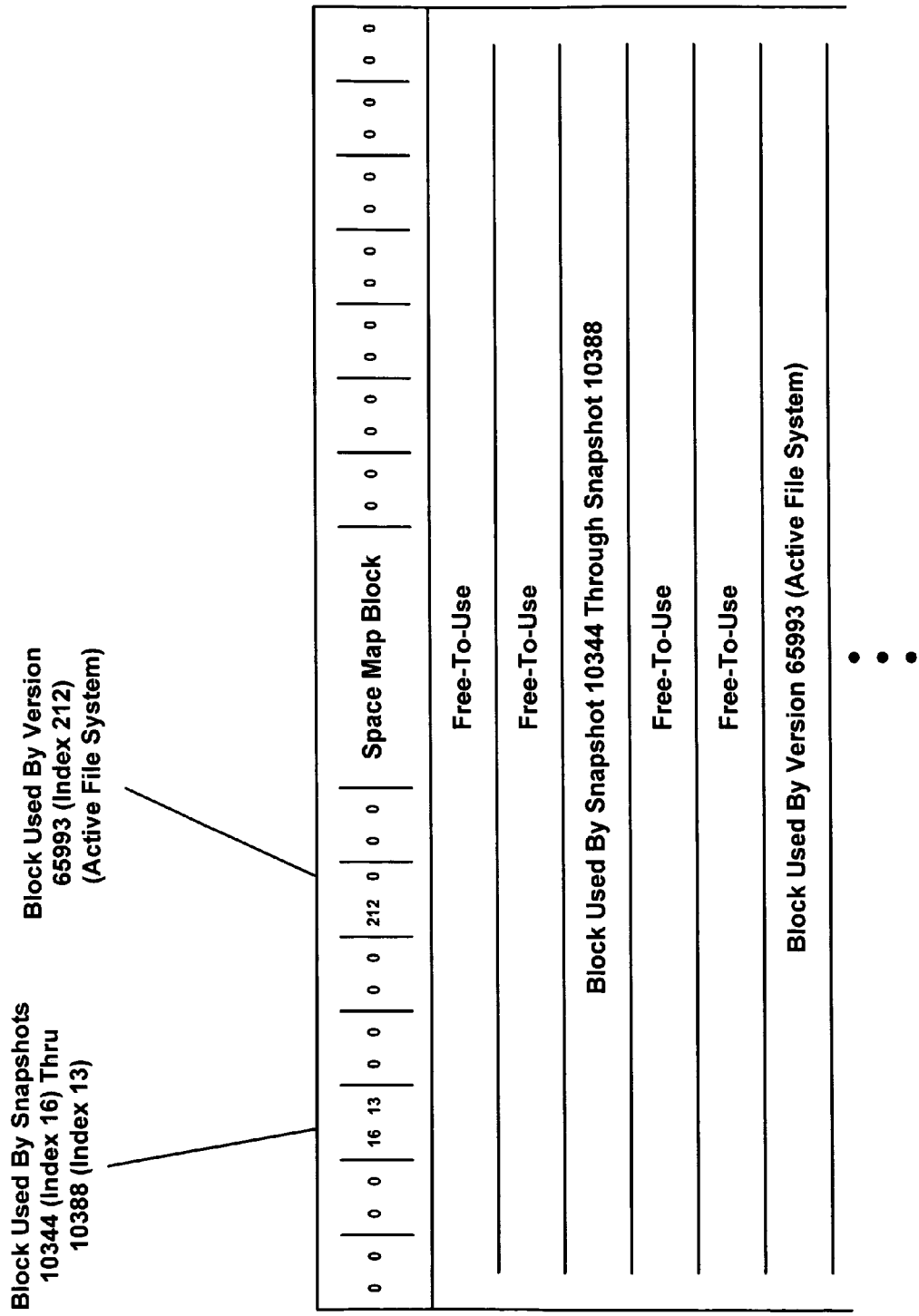
FIG. 5 illustrates examples of a snapshot tracking status in the space map blocks.

FIG. 5 illustrates how a space map block entry is used to track a block in the usable space. In an earlier stage of operation, the space map may contain many entries with beginning and ending values equal to zero indicating that many blocks in the data storage subsystem are free-to-use for snapshots or the active file system. At the same time, other blocks will be in-use that is allocated to snapshots or the active file system. FIG. 5 shows one such block used by snapshots assigned version number 10344 through version number 10388 inclusive. The space map block entry (16, 13) indicates the snapshots that use this block. The host associates the space map block entry with the version number of the snapshot by reading the index table. The space map block also contains space map block entry (212, 0) to show that the active file system, for example, assigned version number 65993 is using an associated block.

Figure 6:
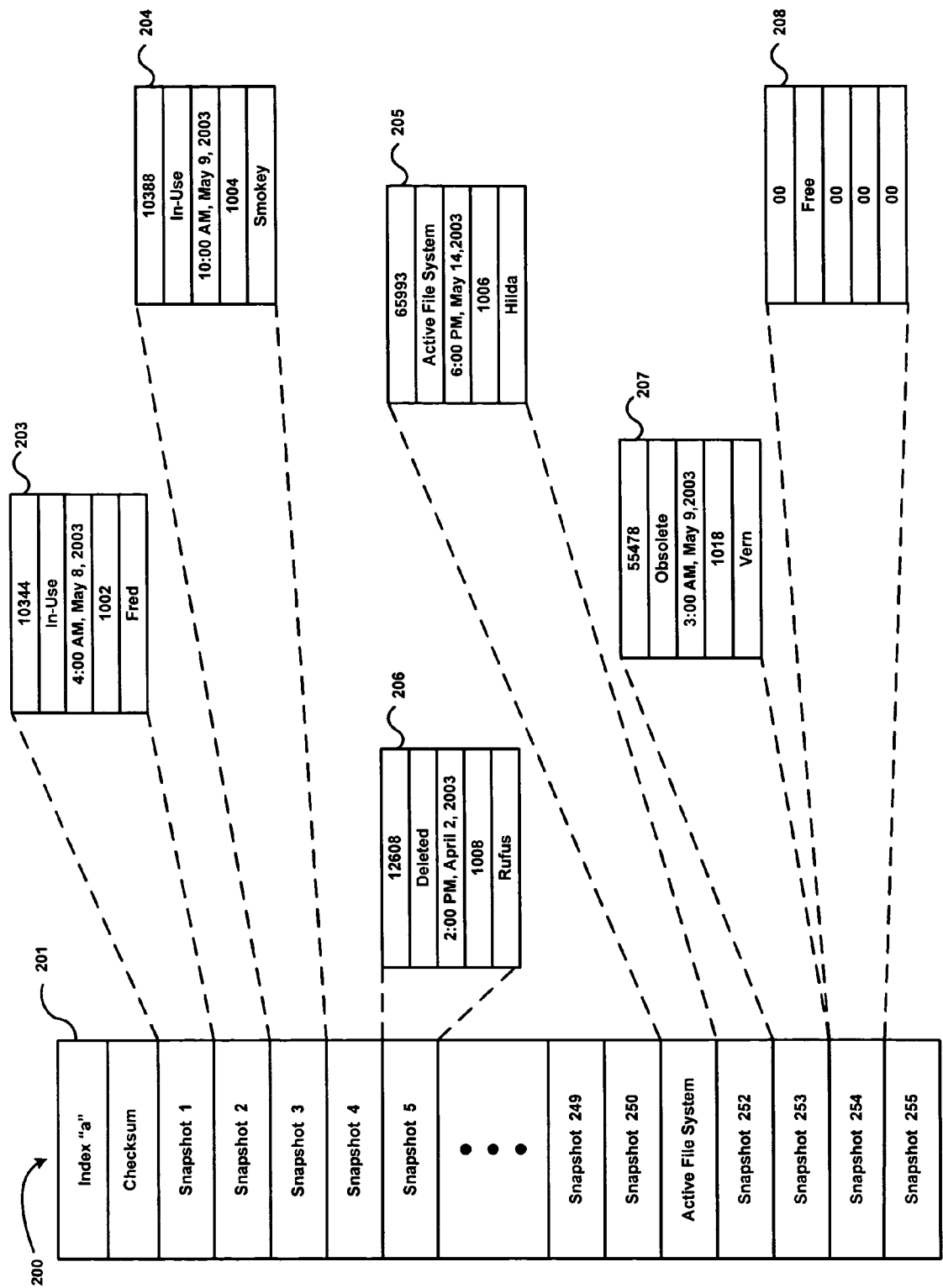
FIG. 6 illustrates details and examples of the snapshot table and snapshot table elements.

FIG. 6 illustrates the relationship between the index table 200 and the snapshot attributes and the active file system attributes. The table below illustrates the group of attributes 203, 204, 205, 206, 207, and 208 that are shown in FIG. 6:

| Index Table Entry | Version Number | Image State | Timestamp | Root block Pointer | Image Name |
|---|---|---|---|---|---|
| Snapshot 1 | 10344 | In-use | 4 AM, May 8, 2003 | 1002 | Fred |
| Snapshot 3 | 10388 | In-use | 10 AM, May 9, 2003 | 1004 | Smokey |
| Active File System | 65993 | Active File System | 6 PM, May 14, 2003 | 1006 | Hilda |
| Snapshot 5 | 12608 | Deleted | 2 PM, Apr. 2, 2003 | 1008 | Rufus |
| Snapshot 253 | 55478 | Obsolete | 3 AM, May 9, 2003 | 1010 | Vern |
| Snapshot 254 | 0 | Free | 0 | 0 | 0 |

Figure 7:
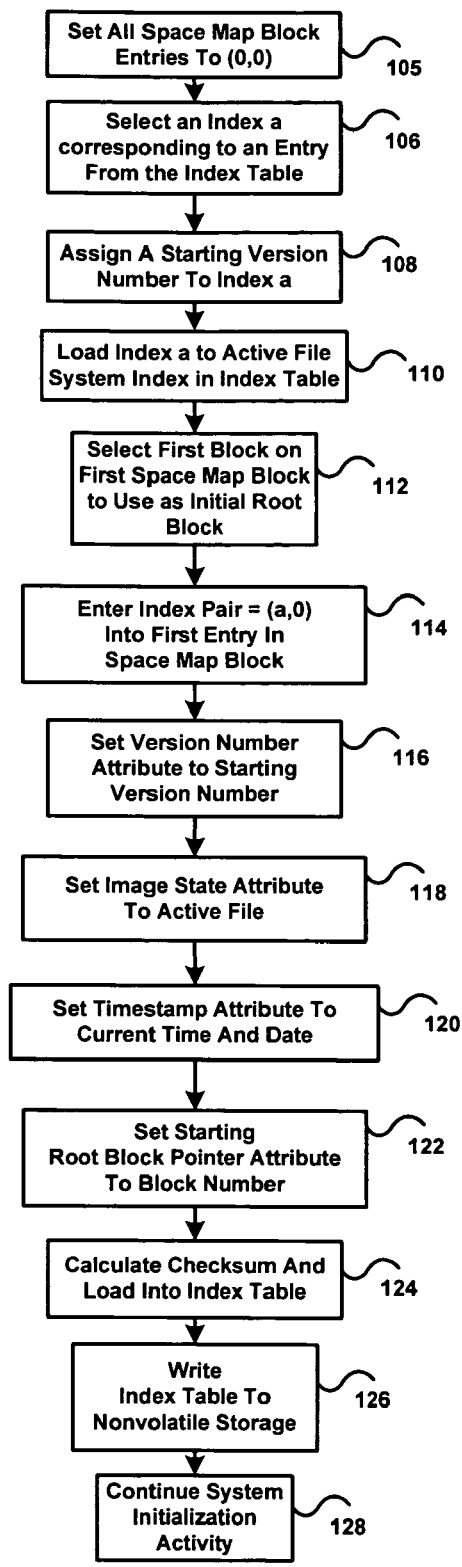
FIG. 7 illustrates a flow diagram for the creation of a file system.

FIG. 7 illustrates a flow diagram of a method for creating a file system. This method can occur during the process of initialization. In an embodiment, the initialization process has proceeded to the point where the next steps relate specifically to file system creation. Although the method is described serially below, the steps can be performed in parallel, for example, asynchronously or in a pipelined manner. There is no requirement the method be performed in the order shown except where indicated. Further, the steps are implemented by computer such as one or more host(s) described earlier. For brevity, we describe the methods as executed by a host.

Referring to step 105 of FIG. 7, the host sets all of the space map block entries equal to (0, 0). This indicates that the blocks corresponding to the entries are free-to-use. At step 106, the host selects an 8-bit index "a" that represents the active file system. At step 108, the host assigns a starting version number to index a. At step 110, the host loads index "a" into the index of the active file system 201 in the directory 200 (FIG. 6). At step 112, the host selects the first available space map block and at step 114 loads the beginning index 8-bit index "a" and an 8-bit ending index 0 into the first entry in the selected space map block. At step 116, the host sets the starting version number in the associated attributes for the active file system in index table entry "a". The host further sets the image state to active at step 118, the timestamp to the current date and time at step 120, and a starting root block pointer at step 122, calls an algorithm to verify the data integrity (e.g., checksum) of the snapshot attributes, and stores the results in index table entry "a" at step 124. At step 126, the host may write the index table to nonvolatile storage. In one embodiment, at step 128, the host continues with any other activities such as initialization. In another embodiment, the other activities can precede the creation of the file system.

Figure 8:
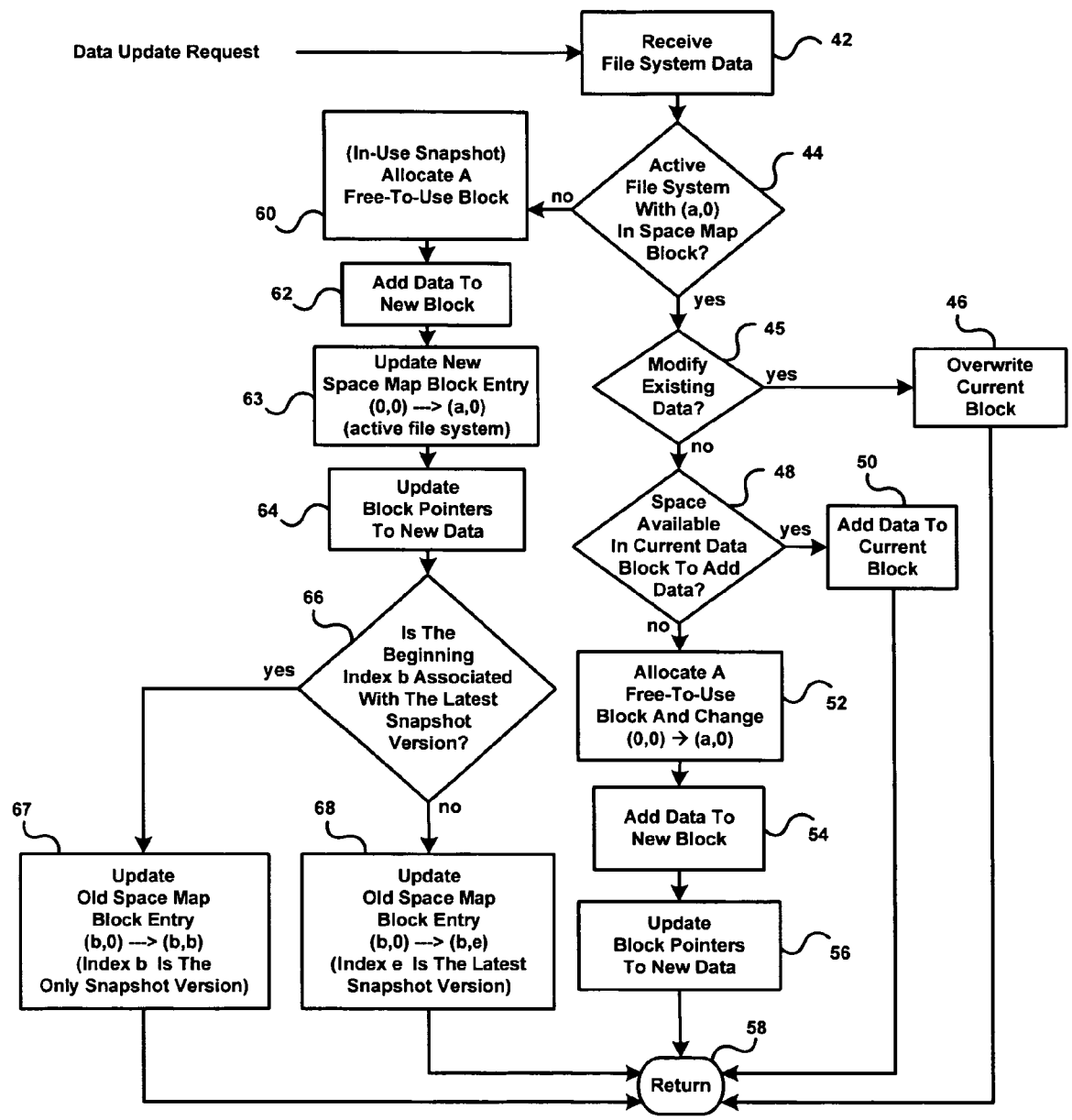
FIG. 8 illustrates a flow diagram for file system block management.

FIG. 8 illustrates a flow diagram of a method of block management. At step 42, the host receives a request to update the file system data. At step 44, the host reads the space map block entry of the associated received data to determine if that block is used by the active file system only. If yes, as indicated by the space map block entry=(a, 0), the host determines at step 45 whether or not the data is a modification of existing data or an addition to existing data. If the received data is a modification of existing data, the host overwrites the block at step 46 and returns to normal operation at step 58. If the received data is an addition to the existing data, the host determines at step 48 if the space available in the current block is enough to hold all of the received data. If yes, the host adds the received data to the current block at step 50 and returns to normal operation at step 58. If not, the host allocates a free-to-use block at step 52 to hold the additional data and changes the associated space map block entry from (0, 0)--> (a, 0). At step 54, the host adds the received data to the newly allocated block. At step 56, the host updates the file system block pointers to point to the new data. At step 58, the block management routine returns to normal system operation.

At step 44, if the space map block entry of the block associated with the received data indicates an in-use snapshot uses the block, that is, the space map block entry (b, 0), the host allocates a free-to-use block for the received data at step 60. At step 62, the host adds the received data to the new allocated block. At step 63, the host changes the space map block entry of the new allocated block from (0, 0)-->(a, 0) indicating the new block is used by the active file system only. At step 64, the host updates the file system block pointers to point to the new data. At step 66, the host determines if there are other in-use snapshots pointing to the same old block. If the index b is associated with the latest snapshot version number, there is no other in-use snapshots pointing to the same old block. Therefore, at step 67, the host updates the old space map block entry from (b, 0)-->(b, b) indicating snapshot b is the only snapshot pointing to the associated old block and that the old data has been modified since snapshot b was created. If the index b is not associated with the latest snapshot version number, there is another in-use snapshot pointing to the same old block. Therefore, at step 68, the host updates the old space map block entry from (b, 0)-->(b, e) to indicate that snapshot b is the beginning snapshot and snapshot e is the ending snapshot (i.e., current in-use snapshot with the latest snapshot version number) pointing to the associated old block. In this case, there may be other snapshots with version numbers less than snapshot e and greater than snapshot b pointing to the same old block. In either case, the block management routine returns to normal system operation at step 58.

Figure 9:
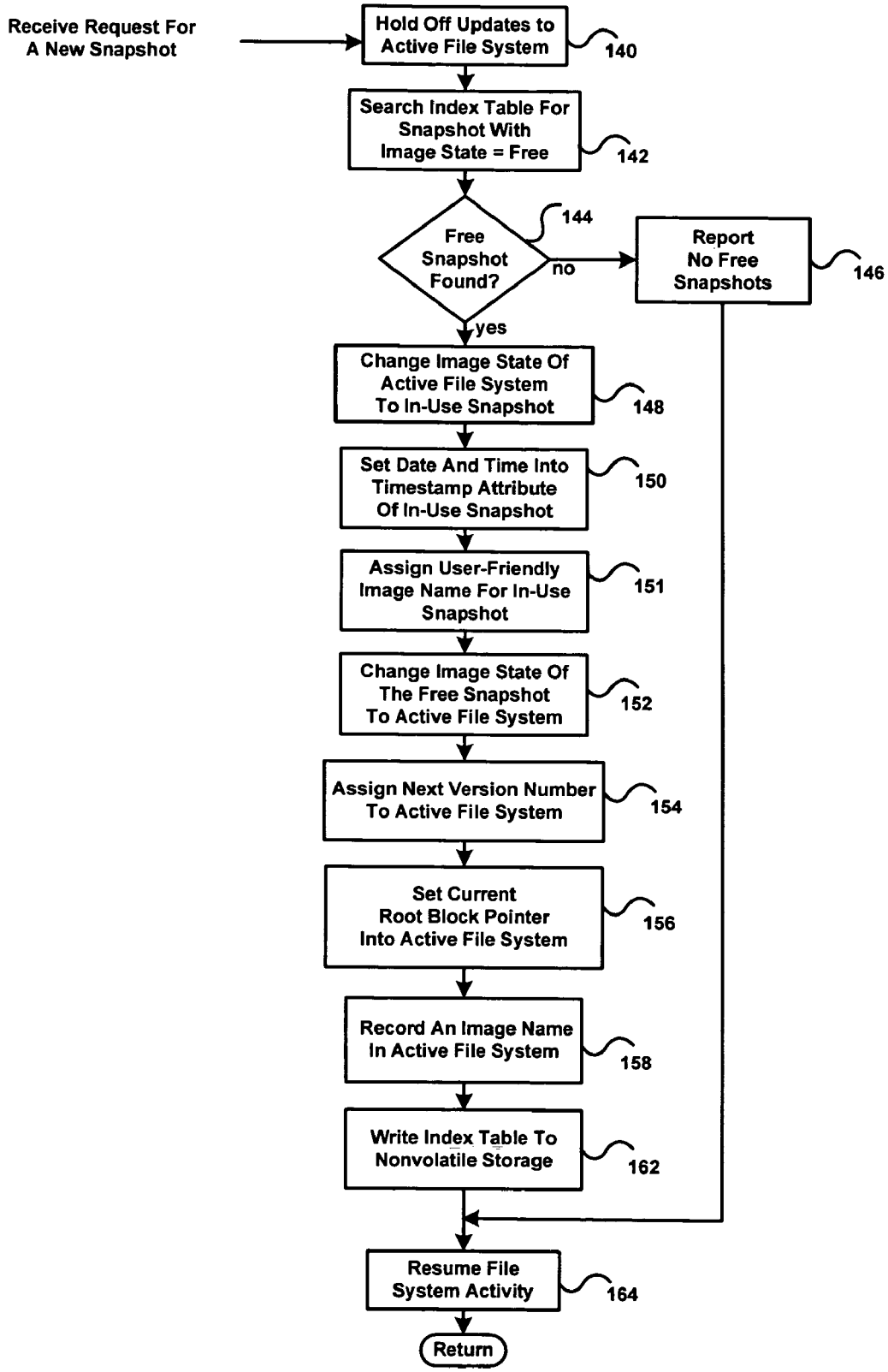
FIG. 9 illustrates a flow diagram for the creation of a file system snapshot.

FIG. 9 illustrates a flow diagram of a method of creating a snapshot. After receiving a request for a new snapshot of the file system, the host holds off from updating the active file system at step 140. At step 142, the host searches through the index table for the first snapshot with an image state equal to free. At step 144, if the host searches the entire index table and does not find a free image state, the routine reports no free snapshots at step 146 and the host resumes normal file system operation at step 164 and if appropriate, the operator can delete some snapshots. If, at step 144, a free image state is found, the host changes the active file system's image state to in-use at step 148. At step 150, the host enters a timestamp of the new in-use snapshot. When this snapshot is created, the version number and the root block pointer remain as they were when the block was allocated to the active file system. At step 151, the host assigns a user-friendly image name for the in-use snapshot. This completes creation of the new snapshot. Next, the host establishes an active file system for normal use. At step 152, the host changes snapshot attributes containing the image state free to the active file system. At step 154, the host assigns the next version number to the new active file system. At step 156, the host enters the current root block pointer (same as the new snapshot) in the attributes of the active file system. At step 158, the host saves a user-friendly image name of the active file system. The snapshot table is written to nonvolatile storage at step 162. The host returns to normal operation at step 164.

Figure 10:
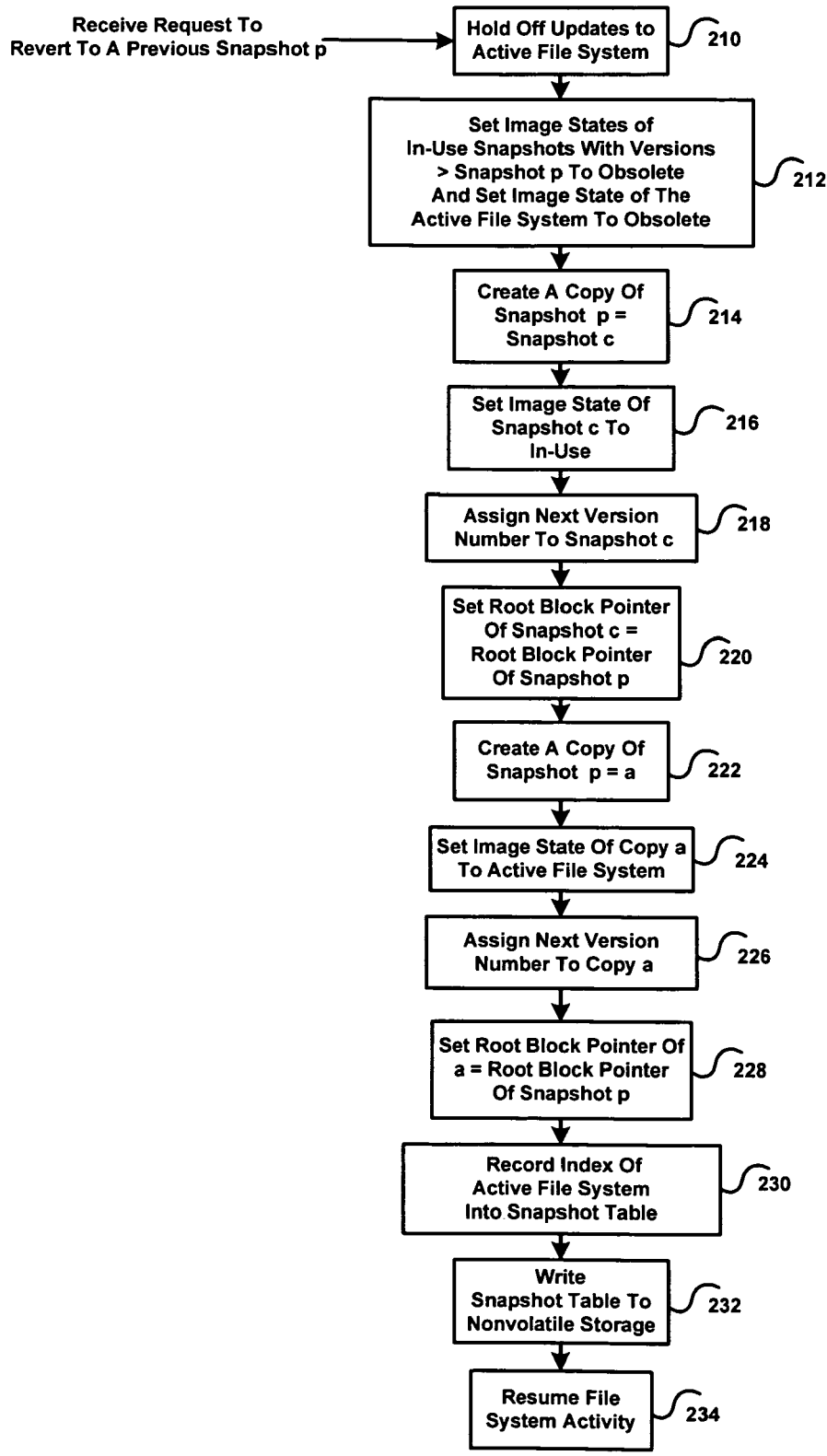
FIG. 10 illustrates a flow diagram of a method to obsolete a file system snapshot.

FIG. 10 illustrates a flow diagram for a method used to revert to an earlier version of a snapshot. FIGS. 15a and 15b illustrate diagrams of the method of reversion. At times it is desirable or necessary to revert to an earlier version of the file system. An earlier version of the file system is any previous snapshot of the active file system. Once a previous snapshot is selected, the host discards all versions of the file system after the chosen version, including the current active file system. After receiving a request to revert to the previous snapshot, for example, snapshot p shown in FIG. 15a, the host will hold off updates to the current active file system at step 210. At step 212, the host changes the image state of all snapshots after snapshot p from in-use to obsolete and changes the image state of the active file system from active to obsolete (See FIG. 15b). At step 214, the host makes a copy of snapshot p, for example, called snapshot c. Snapshot c is used to receive any updates to space map block entry (p, 0) that were held off during the process of reverting to the previous snapshot version. This permits snapshot p to be preserved in its present state after the system is brought back to an active image state, while at the same time, not losing the pending updates. At step 216, the host sets the image state of snapshot c to in-use. At step 218, the host assigns the next unused version to snapshot c. At step 220, the host sets the root block pointer of snapshot c to the same root block pointer of snapshot p. At step 222, the host creates another copy of snapshot p, for example, called copy a. The copy a will become the active file system of the desired image of snapshot p. At step 224, the host sets the image state of copy a to the active file system. At step 226, the host assigns the next version number to copy a. At step 228, the host sets the root block pointer of copy a to the same root block pointer of snapshot p. At step 230 the host records index a of the active file system into the index table 200 (FIG. 6). At step 232, the host writes the index table to nonvolatile storage. At step 234, the host returns to normal file system activity.

Figure 11B:
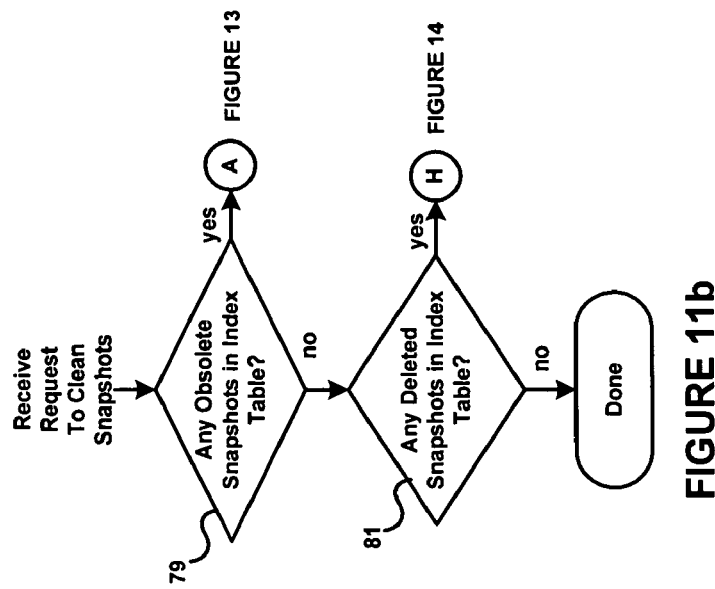
FIG. 11 illustrates a flow diagram of a method to delete a snapshot and for a method to clean unneeded snapshots from space map blocks.
Figure 11A:
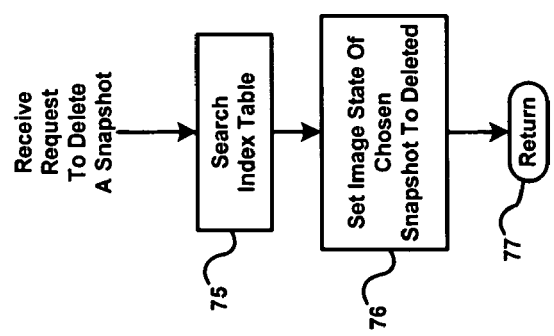

FIG. 11a illustrates a flow chart for a method to delete a snapshot. At step 75, after receiving a request to delete a snapshot (see also FIG. 15c) the host searches the index table for the requested snapshot. At step 76, the host sets the image state of the requested snapshot to deleted. At step 77, the host returns to normal file system operation.

FIG. 11b illustrates a high level flow chart for cleaning deleted and obsolete snapshots from the space map blocks and index table of the file system. At step 79, the host determines if any obsolete snapshots exist. If yes, the host goes to reference A in FIG. 13 to clean obsolete snapshots from the space map blocks. If not, the host goes to step 81 and determines if any deleted snapshots exist. If not, then no work needs to be done and the method is complete. At step 81, if a deleted snapshot is found, the host goes to reference H in FIG. 14 to clean deleted snapshots from the space map blocks and index table of the file system.

Figure 13:
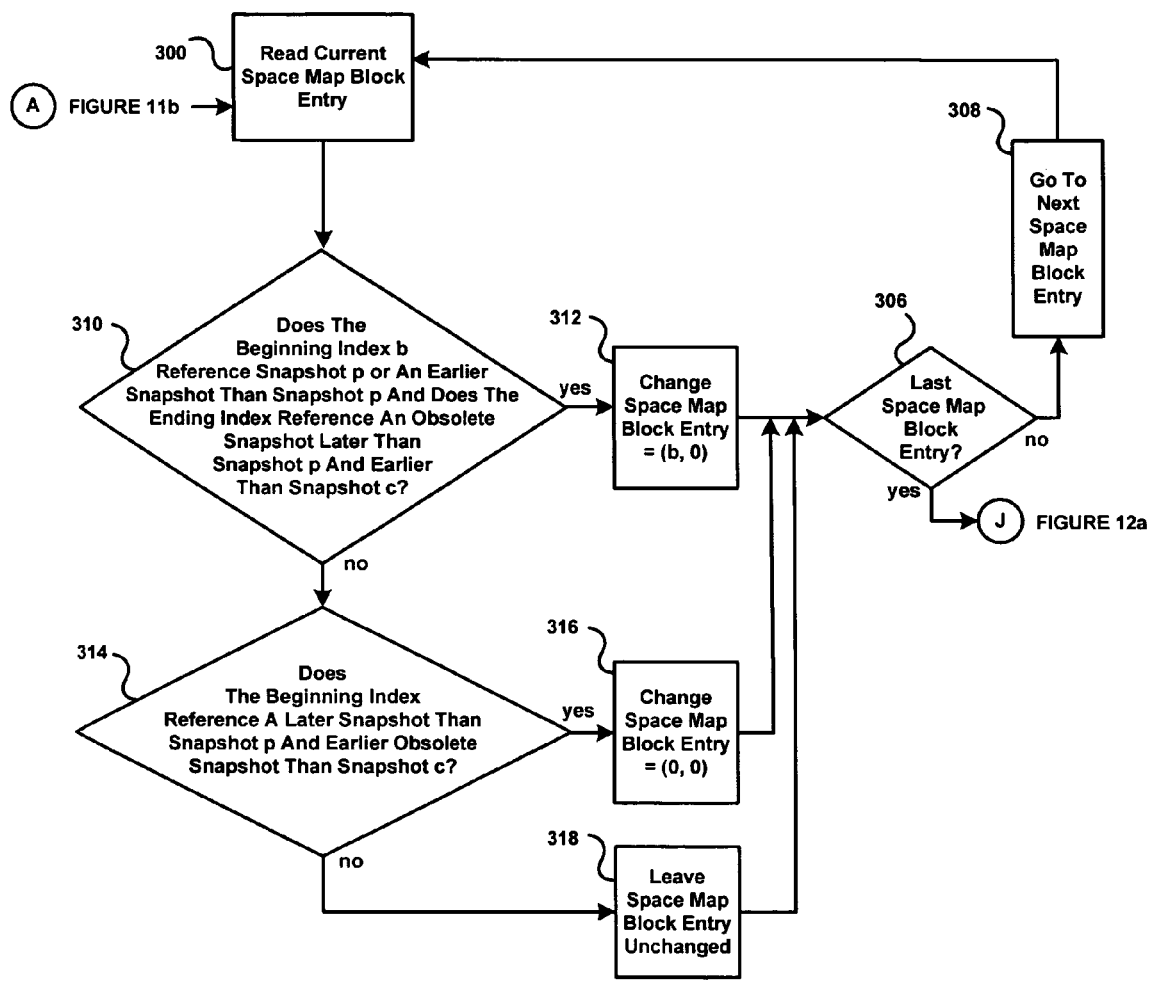
FIG. 13 illustrates a flow diagram of a method to clean obsolete snapshot indexes from space map block entries.

FIG. 13 illustrates the detailed flow chart for cleaning obsolete snapshots from space map block entries after a reversion to snapshot p. Step 300 examines each space map block entry one by one in the file system. Step 310 tests whether the beginning index of the space map block entry either matches the snapshot p to which we reverted or precedes snapshot p while the ending index refers to an obsolete snapshot later than p and earlier than c, the snapshot copy created in step 222 on FIG. 10. If the space map block entry matches these conditions, step 312 changes the space map block entry to (b, 0) to indicate that the block is now in use by the active file system.

If so, step 314 tests if the beginning index of the space map block entry indicates a snapshot later than the reverted-to snapshot p and the ending index indicates an obsolete snapshot earlier than the copy snapshot c. If so, step 316 sets the space map block entry to (0, 0) to indicate that the entry is free-to-use since no snapshot any longer references it.

If neither of the conditions tested by steps 310 or 314 are true, then step 318 leaves the space map block entry unchanged.

After executing step 312, 316, or 318, step 306 tests if we have processed the last space map block entry in the file system. If we have processed the last entry, processing continues at Reference J on FIG. 12a to remove the index table entry for all the obsolete snapshots. Otherwise, step 308 moves to the next space map block entry and processing continues at step 300.

Figure 12B:
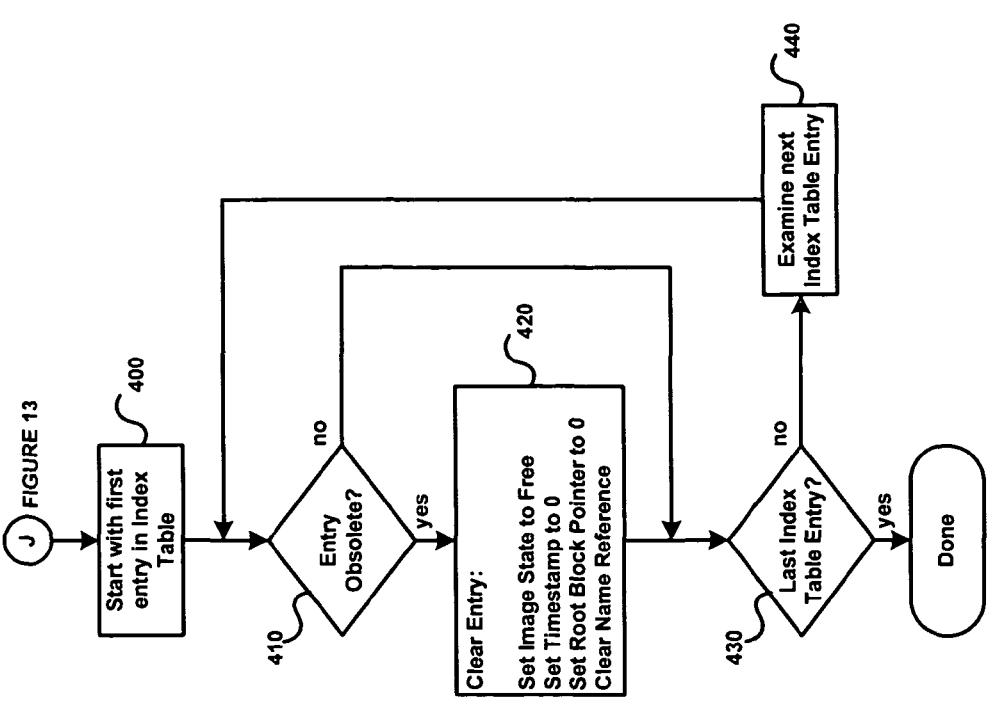
FIG. 12 illustrates a flow diagram of a method to remove obsolete snapshots from the index table and for a method to remove deleted snapshots from the index table.
Figure 12A:
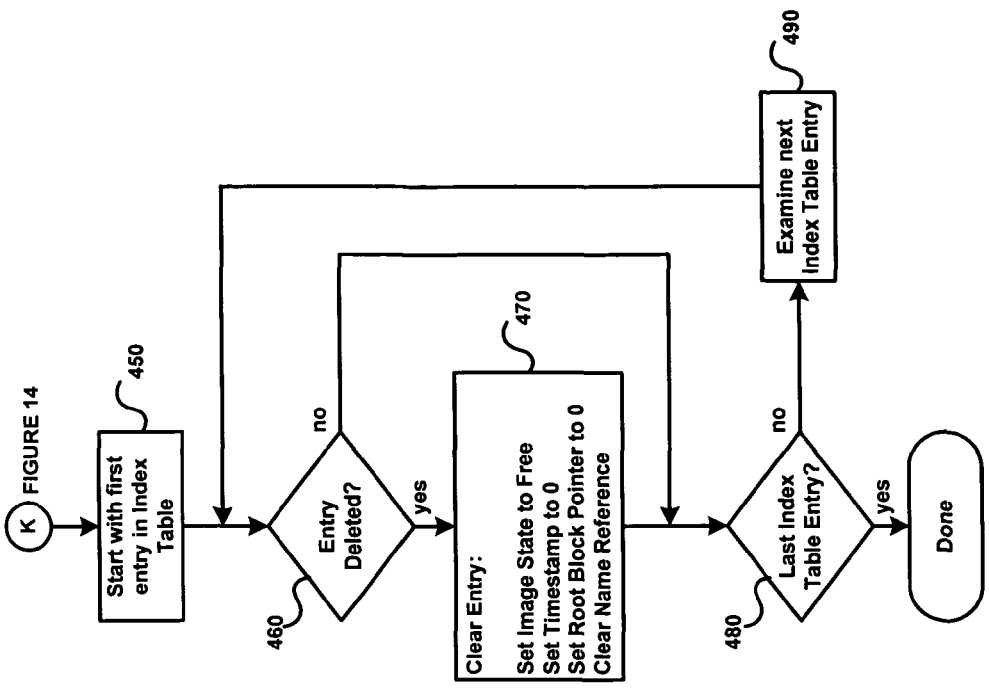

After completing the processing of all obsolete snapshots in the space map blocks, processing continues at Reference J on FIG. 12a to remove the index table entries corresponding to obsolete snapshots. Processing begins at the first index table entry in step 400. Step 410 tests if the index table entry is obsolete. If so, step 420 clears the index table entry by setting the image state to free-to-use, the timestamp to 0, the root block pointer to 0, and by clearing the name reference. Step 430 tests if we have processed the last index table entry. If this is not the last index table entry, step 440 moves to the next index table entry and processing continues at step 410. After all index table entries have been processed, all obsolete snapshots have been completely removed from the file system.

Figure 14:
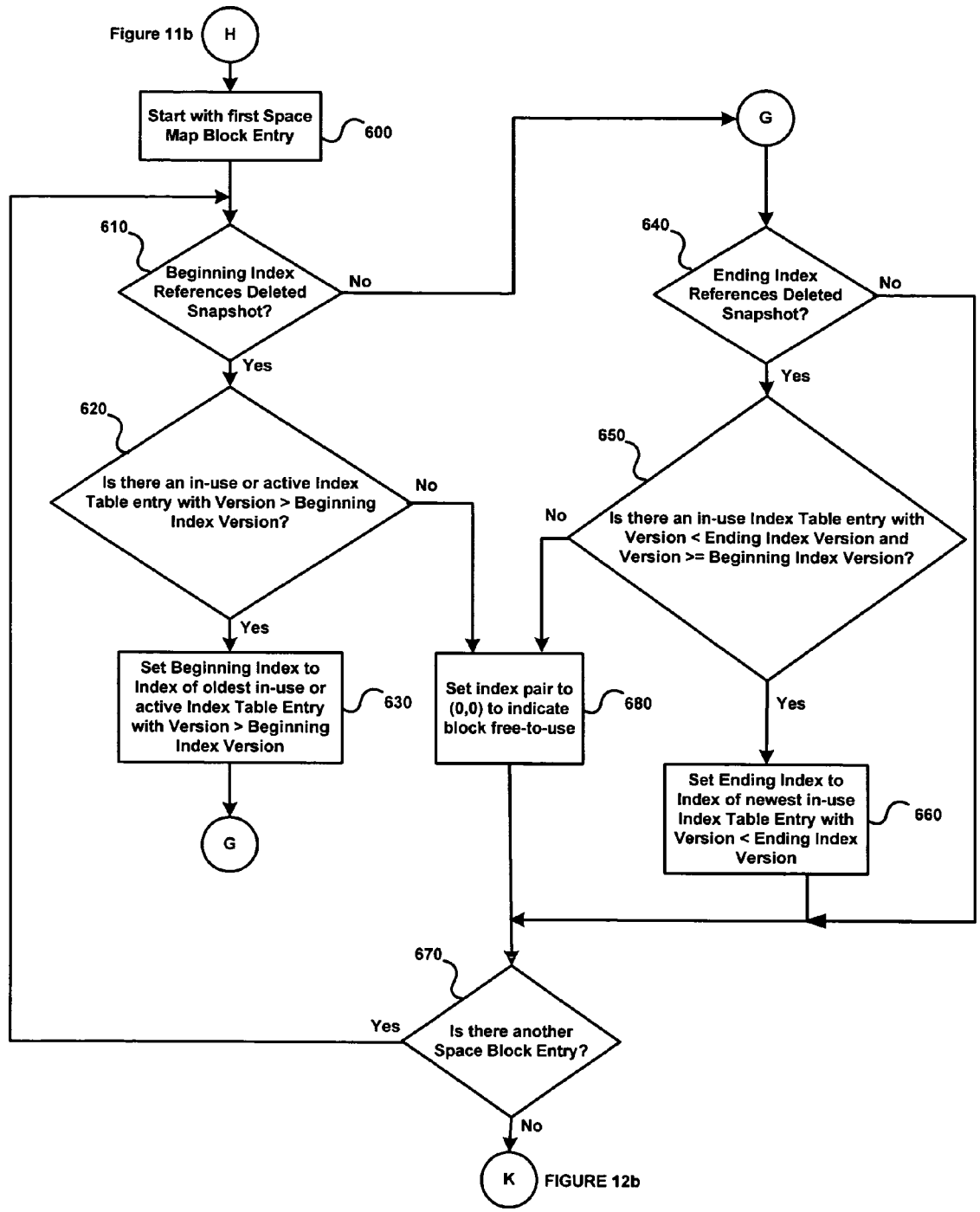
FIG. 14 illustrates a flow diagram of a method to clean deleted snapshot indexes from space map block entries.

Returning to FIG. 11b, if step 81 detects any deleted snapshots in the index table, processing continues at Reference H on FIG. 14. On FIG. 14, step 600 begins with the first space map block entry. Step 610 tests if the beginning index of the space map block entry references a deleted snapshot. If yes, then step 620 tests for any active file system or in-use snapshot with a version later than the beginning space map block entry index. If no snapshot or active file system is found later than the space map block entry beginning index, then step 680 sets the entry to (0, 0) to indicate the corresponding block is free to use. If a later snapshot or active file system is found, step 630 sets the beginning index of the space map block entry to the index of the found snapshot or active file system and continues processing at Reference G on the same sheet.

Step 640 similarly tests the ending index of the space map block entry to see if it references a deleted snapshot. If so, step 650 tests if there is a snapshot with version less than the current ending index and later than or equal to the version of the beginning index. If not, step 680 sets the space map block entry to (0, 0) to indicate that the block is free-to-use. Otherwise, step 660 sets the ending index to the latest in-use snapshot before the current ending index.

After completion of either step 660 or 680, step 670 tests for another space map block entry. If there are more space map block entries to process, control returns to step 610. After all space map block entries have been processed, control resumes at Reference K on FIG. 12b to remove index table entries for deleted snapshots.

Figure 16:
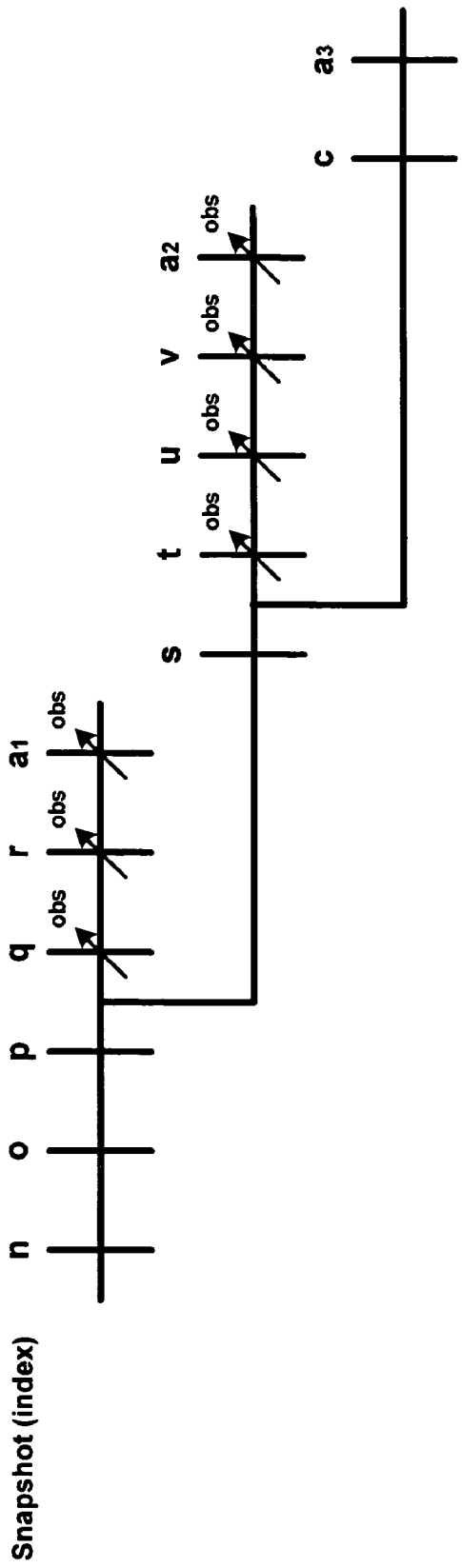
FIG. 16 illustrates a diagram of multiple reversions to earlier snapshots.

FIG. 16 illustrates a diagram of a case where a second reversion to a prior snapshot s has occurred before the background cleaning process for the first reversion to snapshot p has completed. As the file system reverts to a prior snapshot, a pending list is maintained to record the indexes and associated version numbers of the affected snapshots each time the reversion process is invoked. If the file system reverts to more than one snapshot over a span of time where the background cleaning process has not completed, the pending list organizes the cleaning activity by individual reversion event to maintain data reliability of the snapshots. Multiple reversions are likely to occur in large and/or high activity test environments.

At times, a user may want to free storage space in the file system. Because some data may not be deleted without prior consent, a user administering a data storage system may seek a quicker way to get more storage space. For example, the user may be curious how much space will be freed if he deletes older snapshots. However, since the present invention provides snapshots that share blocks and different snapshots share varying amounts of space with each other and with the active file system, it may not be apparent how much space will be freed by deleting a given snapshot.

The invention enables a user to determine in advance how much freeable space will be acquired by deleting a given snapshot. FIG. 17 illustrates a user interface for presenting snapshot statistics and assisting in snapshot management that can be run in a management controller of a data storage system such as described in U.S. application Ser. No. 10/837,322, Guided Configuration of Data Storage Systems, filed on Apr. 30, 2004, now U.S. Pat. No. 7,216,192 B2, and in particular, FIGS. 2-3 and accompanying specification, and incorporated by reference herein.

Referring to FIGS. 17-18, the user interface uses a table to represent a set of snapshots and each of their attributes (e.g., image name, timestamp and freeable space) and select one or more snapshots for deletion. Below this table are graphical elements to actually delete the selected snapshots. The total field keeps a running tally of the total freeable space in GB that will be obtained if the selected snapshot(s) are deleted.

FIG. 17 illustrates the user interface as displaying a set of snapshots (e.g., eight snapshots) taken over a time period (e.g., several weeks). Once the user selects a first snapshot for deletion, the user interface presents a first value of freeable space. As shown, if the user marks the check box adjacent the snapshot with an image name of weekly 1 and a timestamp of Apr. 2, 2006, the user interface presents a value of freeable space, e.g., 1150 GB. The user can delete the first snapshot by interacting with another graphical element (e.g., delete snapshots) and the freeable space, e.g., 1150 GB, is released to the free memory in the file system.

If the user decides instead he wants to start all over again in selecting snapshots for deletion without leaving the user interface for snapshot management, he can interface with another graphical element (e.g., clear selections) and all snapshot selections will be cleared (e.g., marks in the checkbox erased).

FIG. 18 illustrates the user interface, prior to deletion of the first snapshot selected, after the user selects a second snapshot with an image name of daily 4 and a timestamp of Apr. 12, 2006. Now the freeable space shows a second value of freeable space, e.g., 700 GB. In our example, the freeable space of the first snapshot also increases (e.g., from 1150 to 1300) since the first and second snapshot share an additional 150 data blocks. Finally, the user interface presents the total freeable space, e.g., 2000 GB, that will result once the first and second snapshots are actually deleted.

After all selections are made as illustrated by the two snapshots in FIG. 18, the user will make his final decision on whether the value of keeping the snapshots is less than the benefit of freeing up that amount of storage space. If so, the user executes his final decision by interacting with the graphical element (e.g., delete snapshots). This two-step selection and deletion process enables the user to see the freeable space associated with any combination of snapshots before deletion and reduces the chance of unintentional deletions. Again, if the user wants to clear the selections, prior to deletion, he can select the clear selections button or select exit to leave this user interface (not shown). In alternative various embodiments, the user interface can present the same information and choices as just explained in a menu-based or command based interface.

To present this information in the user interface, the file system maintains the snapshot space statistics in the following manner. The file system will scan all the space map blocks at time intervals and count the number of each type of space map block entry in the space map blocks. Because space map block entries serve as an index to a block in user data space, the blocks can be related to each snapshot. In an embodiment, the invention stores the free space information after a scan (e.g., a scan to free blocks from deleted or obsolete snapshots) and keeps the free space information up to date during operation and with creation and deletion of snapshots.

To keep track of the blocks associated with each snapshot, the file system provides a data structure referred to as snapspace matrix or simply snapspace.

FIG. 19 illustrates a small snapspace matrix that is a two-dimensional array in the file system and indexed by beginning and ending (b, e) snapshot indexes in space map blocks. The size of the snapspace matrix corresponds to the number of snapshots to be taken, and can be static or dynamic at run time. The number of space map blocks and their size depends on the relative allocation between the usable data space and the space map blocks and the overall size of the file system as shown in FIG. 4.

As shown in FIG. 19, each element of the snapspace matrix contains the number of index entries found in the space map blocks. If each space map block entry points to one block in usable data space (see FIG. 4), each element also contains the number of blocks associated with that index entry (b, e). For example, the first and second space map blocks each contain five index entries (0,0), representing free blocks, so element [0,0] of the snapspace matrix contains 10. Further, the first and second space map blocks each contain an index entry (3,1) so element [3,1] of the snapspace matrix contains 2 blocks. The first space map block contains an index entry (1,0), representing the active file system, so element [1,0] of the snapspace matrix contains 1 block, while the second space map block contains an index entry (2,2), so element [2,2] of the snapspace matrix contains 1 block. Because the number of space map block entries corresponds to the number of blocks in the file system having a given index entry, a 64-bit counters should be more than adequate in many situations to keep track of the number of index entries contained in each element of the snapspace matrix.

Figure 20A:
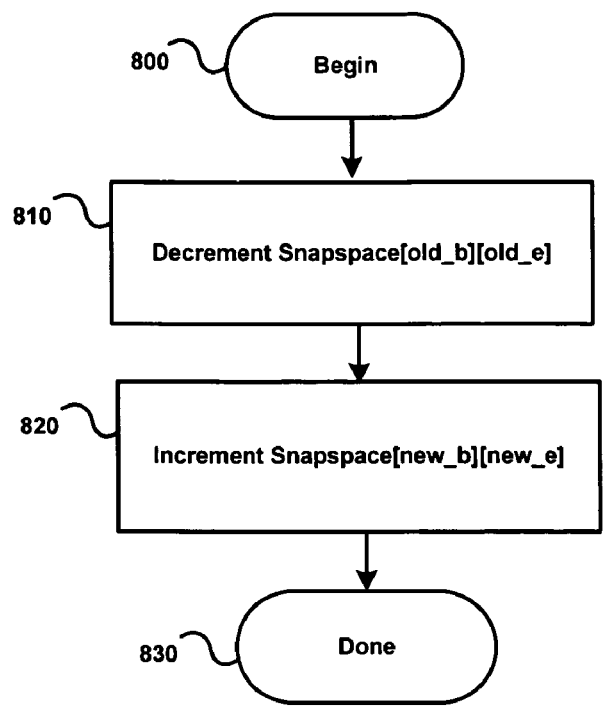
FIG. 20 illustrates file system updates to the snapspace matrix.
Figure 20B:
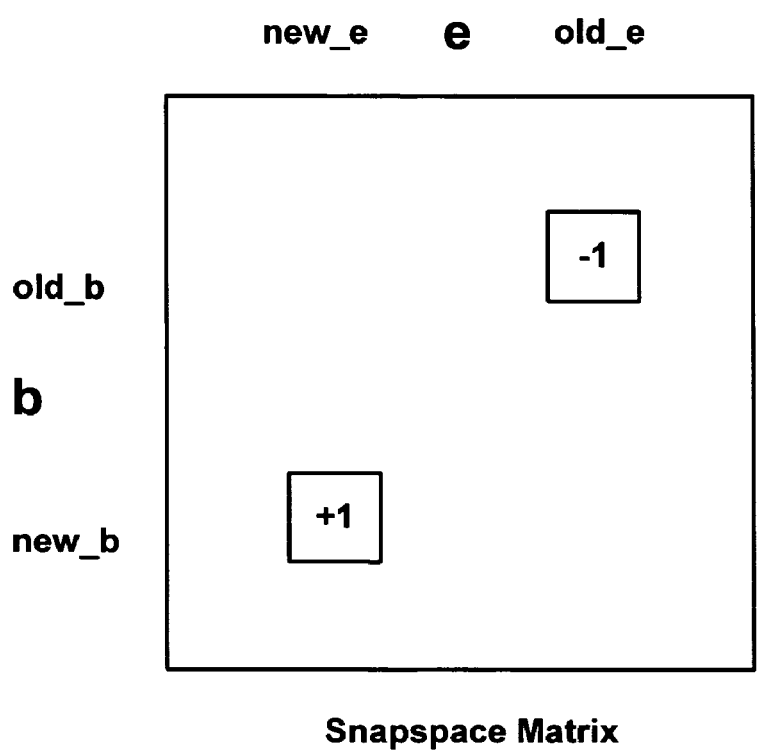

Operations that scan and update the space map blocks to remove deleted and obsolete snapshots update the snapspace matrix as described earlier for normal operations. As shown in FIG. 20A, during operation on space map block p, the file system updates the snapspace matrix beginning at step 800. If a normal operation changes a space map block entry from (old_b, old_e) to (new_b, new_e), the file system updates the snapspace matrix by decrementing snapspace [old_b, old_e] at step 810 and incrementing snapspace [new_b, new_e] at step 820. At step 830, the method of update is done. This value swap also illustrated in FIG. 20B entails the total value of all of the elements of the snapspace matrix remains constant which is to be expected given a file system has a predetermined size.

File system utilities can use the snapspace matrix to determine the number of blocks a user will free by deleting a snapshot. In one case, snapspace [s,s] indicates the number of blocks that deleting snapshot s will free. As the user considers the deletion of more snapshots, the file system takes into account the cumulative effect of deleting a set of snapshots. An embodiment can simply copy the snapspace matrix and update the copy accordingly as the user considers deleting various snapshots.

In another aspect, the invention provides a snapspace matrix that reduces the required memory needed to hold the elements of snapspace matrix updated during normal operations. During normal operation with active index a and the most recent snapshot having index r, the file system changes the space map block entries to (b, r) and allocates new space with entries of the form (a, 0). If we arrange snapspace by columns and put snapspace [b, e] adjacent to snapspace [b+1, e] then we need to keep in memory only 2×256×8 bytes or 4,096 bytes.

Figure 21:
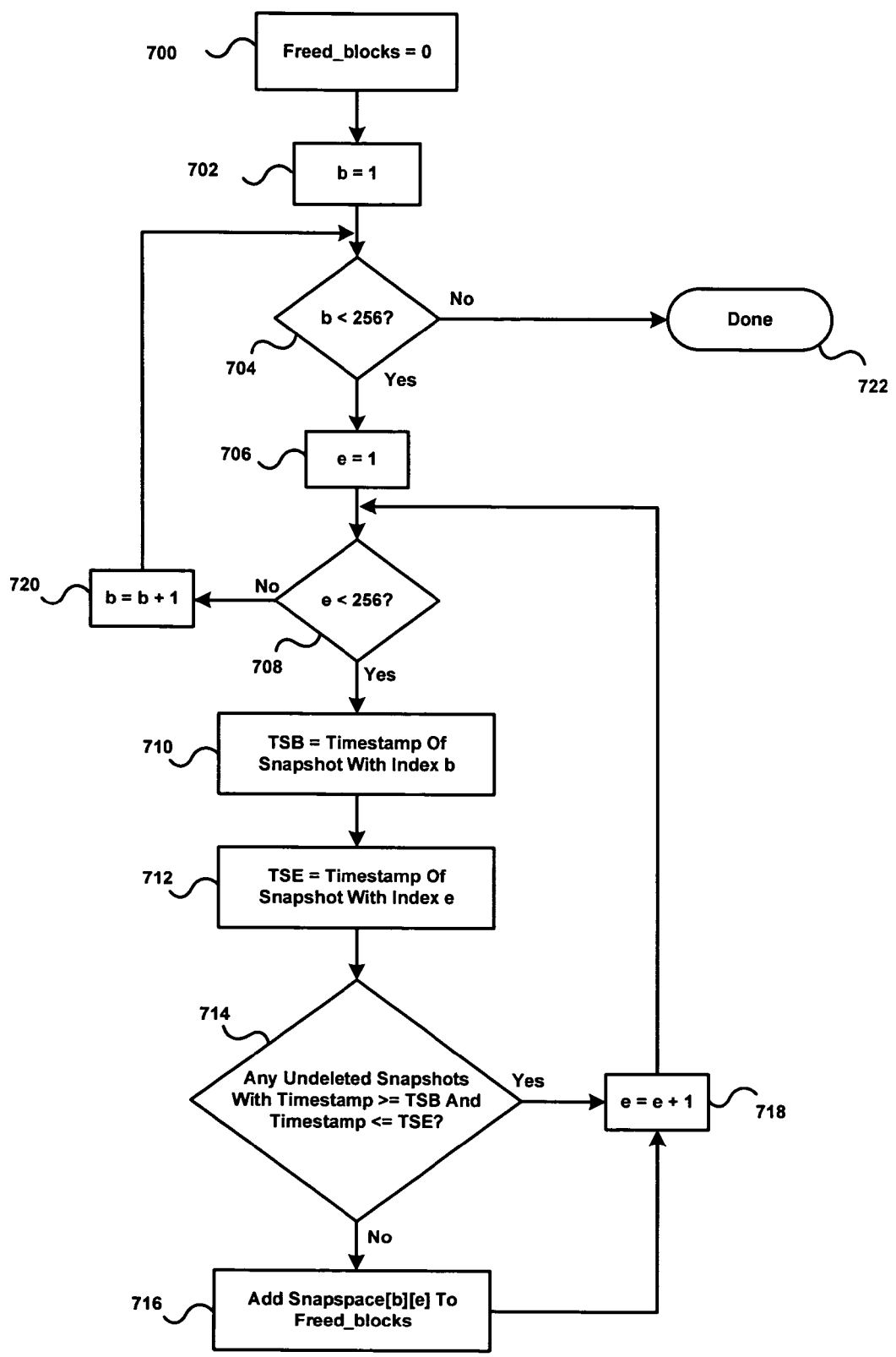
FIG. 21 illustrates a method for calculating the free space available after deleting one or more snapshots.

FIG. 21 shows a flowchart of a method for calculating the amount of free space available after deleting one or more snapshots. At step 700, the method initializes the variable Freed_blocks to zero. Freed_blocks will accumulate the number of blocks available in deleted snapshots. At step 702, the method initializes the variable b to 1. The variable b indicates the beginning snapshot index under current consideration; no space map block entry representing allocated space has a beginning index of 0, so the method starts with 1. At step 704, the method compares b to see if the maximum value of 256 has been reached. If so, the method terminates at step 722 with Freed_blocks containing the total number of blocks available in deleted snapshots. At step 706, the method initializes the variable e to 1; e indicates the ending snapshot index under consideration. Since no space map block entries representing space that can be freed end in 0, the method begins with the value of 1. At step 708, the method compares e to the maximum value; if e has reached this value, the method increments b at step 720 and resumes execution at step 704. At step 710, the method determines the value TSB representing the timestamp of the snapshot index b. At step 712, the method determines the value TSE representing the timestamp of snapshot index e. At step 714, the method tests for any undeleted snapshots with a timestamp between TSB and TSE, inclusive. If there are any such snapshots, then the file system still needs to retain blocks represented by space map block entry (b, e), so the method increments e to the next value at step 718 and resumes execution at step 708. At step 716, the method has determined no snapshots still need to retain blocks represented by space map block entry (b, e), so the method adds Snapspace[b][e] to Freed_blocks, then continues execution at step 718.

In an embodiment, an array is prepared in advance that contains the timestamps of undeleted snapshots sorted in ascending order. The search for undeleted snapshots with a timestamp between TSB and TSE at step 714 is performed by a binary search of the array of timestamps for any timestamp at least as large as TSB and no larger than TSE.

While the method of FIG. 21 determines the space allocated to deleted snapshots, it can be modified to determine the space allocated by a set of snapshots proposed to be deleted by changing the test at step 714 to test for any snapshots not in the proposed list with timestamps between TSB and TSE.

An enterprise may want to protect data contained in its file system by storing a remote copy of the file system off-site if the primary data storage system fails or in the event of a local disaster. Data replication can provide this protection by transmitting the primary file system over a network to a secondary data storage system.

The primary data storage system's file system is actively modified. The primary data storage maintains a base snapshot of the active file system that represents the contents of the file system of the secondary data storage system. To bring the secondary file system up-to-date after modifications to the blocks of the primary file system, the primary data storage system will periodically (e.g., hourly or daily or weekly) take a delta snapshot, examine the space map block entries of the file system to identify the modified blocks between the base snapshot and the delta snapshot, and transmit the modified blocks from the primary data storage system to the secondary data storage system.

An enterprise may also protect data in its file system by only backing up the blocks that have been modified since the last back up. The invention provides an efficient way to find the modified blocks.

FIGS. 22*a* through 22*g* shows the relationship between a block that has an associated space map block entry (b, e) and a base snapshot and a delta snapshot. These relationships explain whether the block has been modified after the base snapshot and is still in use in the delta snapshot and therefore contains new or modified information associated with the delta snapshot.

Figure 22A:
FIGS. 22a-22g illustrate block modifications with respect to a base snapshot and a delta snapshot.

In FIG. 22*a*, the space map block entry describes a block allocated and freed before the base snapshot. Therefore, the block was not modified after the base snapshot and is not associated with the delta snapshot.

Figure 22B:
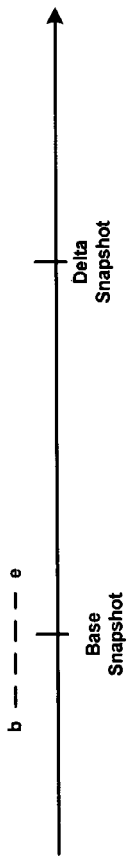

In FIG. 22*b*, the space map block entry describes a block allocated before the base snapshot and freed before the delta snapshot. While the block transitions from being allocated to not being allocated between the base snapshot and the delta snapshot, the data on the block is not modified.

Figure 22C:
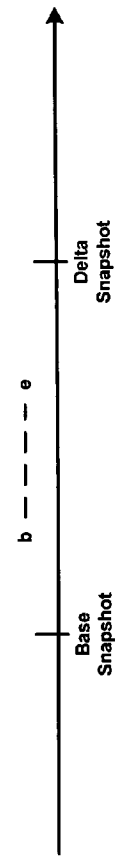

In FIG. 22*c*, the space map block entry describes a block allocated after the base snapshot and freed before the delta snapshot. Therefore, the block does not contain data that changed since the base snapshot and is still allocated after the delta snapshot.

Figure 22D:

In FIG. 22*d*, the space map block entry describes a block allocated after the base snapshot and freed after the delta snapshot. Therefore, the block was modified after the base snapshot and is still allocated after the delta snapshot. The block is modified between the base snapshot and the delta snapshot.

Figure 22E:

In FIG. 22*e*, the block is allocated and freed after the delta snapshot. Therefore, the block is not modified between the base snapshot and the delta snapshot.

Figure 22F:
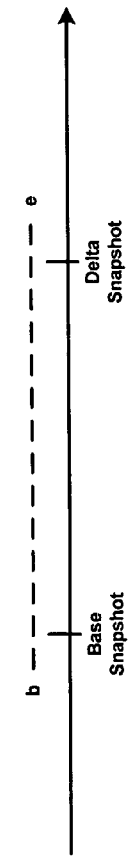

In FIG. 22*f*, the block is allocated before the base snapshot and freed after the delta snapshot. Therefore, the block is not modified between the base snapshot and the delta snapshot.

Figure 22G:

In FIG. 22*g*, the space map block entry describes a block allocated after the base snapshot that remains active (i.e., as indicated by the last entry being "0") after the delta snapshot. Therefore, the block was modified after the base snapshot and is still allocated after the delta snapshot. The block is modified between the base snapshot and the delta snapshot.

Figure 23:
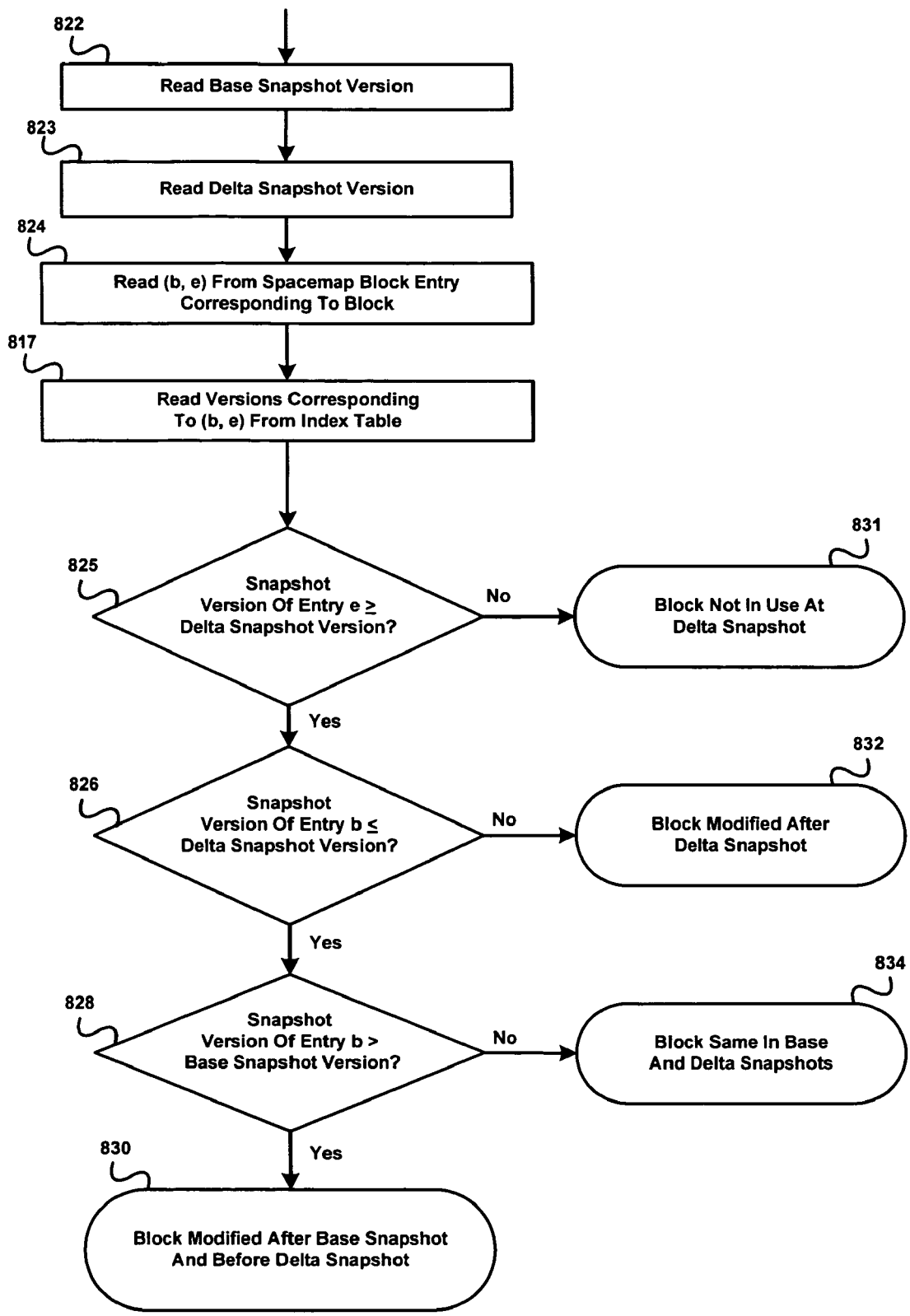
FIG. 23 is a flow diagram illustrating a method for determining if a block has been modified with respect to a base snapshot and a delta snapshot.

FIG. 23 shows a method implemented in a software program and executed in a host (FIG. 1) that determines whether a block is modified after a base snapshot and before a delta snapshot. At step 822, the method reads the base snapshot version (e.g., time stamp or version number). At step 823, the method reads the delta snapshot version (e.g., time stamp or version number). At step 824, the method reads (b, e) from the space map block entry corresponding to the block. At step 820, the method reads versions corresponding to (b, e) from the index table. At step 825, the method tests if the snapshot version corresponding to entry e is greater than or equal to the delta snapshot version. If not, the method indicates that the block is not in use at the delta snapshot (see FIGS. 22*a*, 22*b*, and 22*c*) and terminates at step 831.

If the snapshot version corresponding to the entry e is greater than or equal to the delta snapshot version at step 825, the method tests if the snapshot version corresponding to the entry b is less than or equal to the delta snapshot version at step 826. If not, the method determines that the block was modified after the delta snapshot (see FIG. 22*e*) and terminates at step 832. If so, the method tests if the snapshot version corresponding to the index b is greater than the base snapshot version at step 828. If not, the method determines that the block is the same in the base snapshot and the delta snapshot (see FIG. 22*f*) and terminates at step 834. If so, the method determines that the block was modified after the base snapshot and is still allocated to the delta snapshot (see FIGS. 22*d* and 22*g*) and terminates at step 830.

Figure 24:
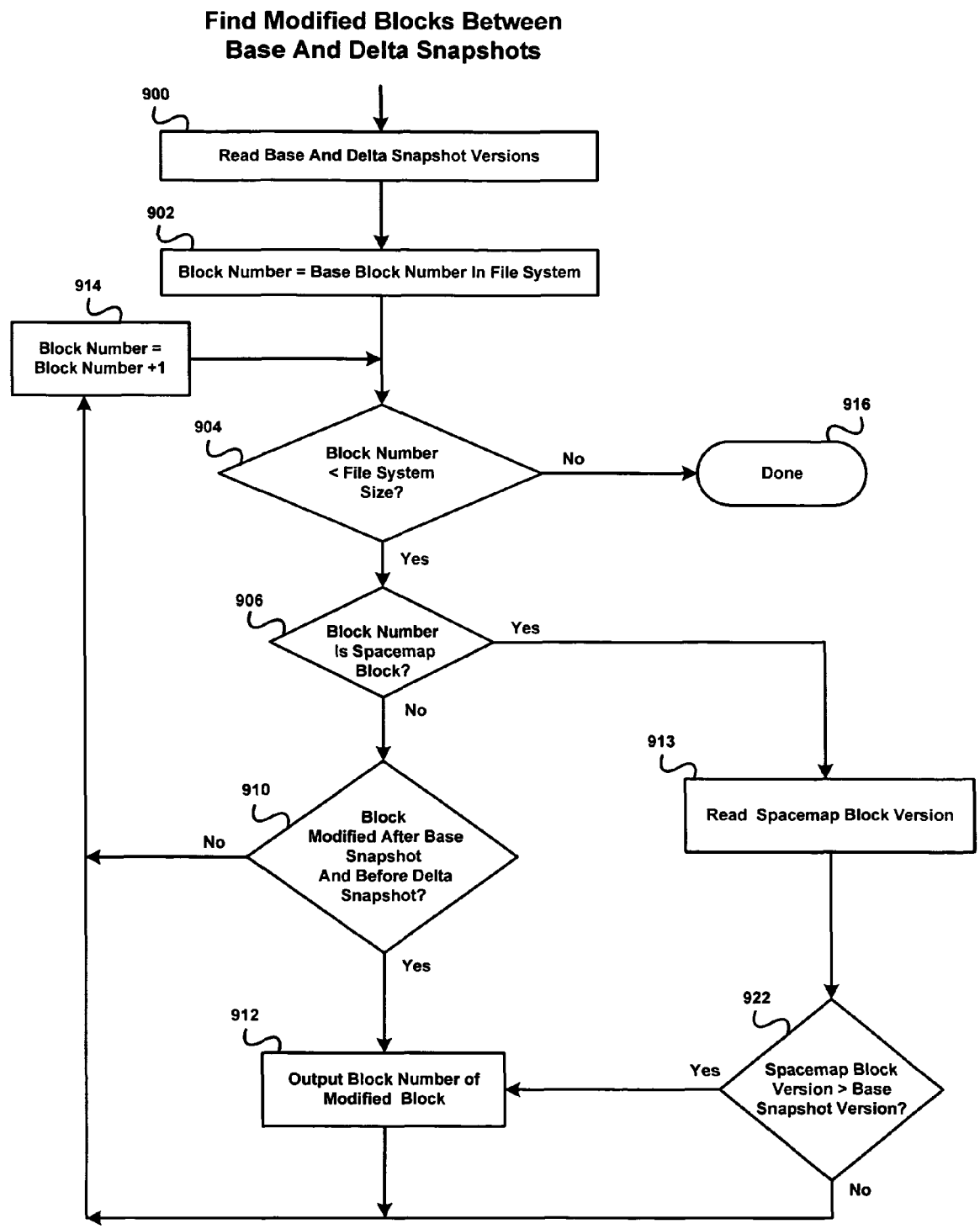
FIG. 24 is a flow diagram illustrating a method for finding all the blocks that have been modified in a delta snapshot since a base snapshot was taken.

FIG. 24 shows a method implemented in a software program executed in a host for finding all the blocks modified in a file system between a base snapshot and a delta snapshot. At step 700, the method reads the base and delta snapshot versions. At step 702, the method sets a block number to the base block number in the file system. At step 704, the method checks if block number is less than the file system size. If not, the method terminates at step 716. Steps 702 and 704 determine the block is in the file system.

If the block is in the file system, the method tests if the block number is a space map block at step 706. If yes, at step 713, the method reads the space map block version. At step 722, the method tests if the version of the space map block is greater than the version of the base snapshot. If yes, the method proceeds to step 712 and outputs the block number of the modified block. If not, the method increments the block number at step 714 and resumes at step 704.

If step 706 determines that the block number is not a space map block, the method proceeds to step 710 that determines if the block was modified after the base snapshot and before the delta snapshot (FIG. 23). If not, the method increments the block number at step 714 and resumes at step 704. If yes, the method outputs the block number of the modified block at step 712, increments the block number at step 714 and resumes at step 704.

Figure 25:
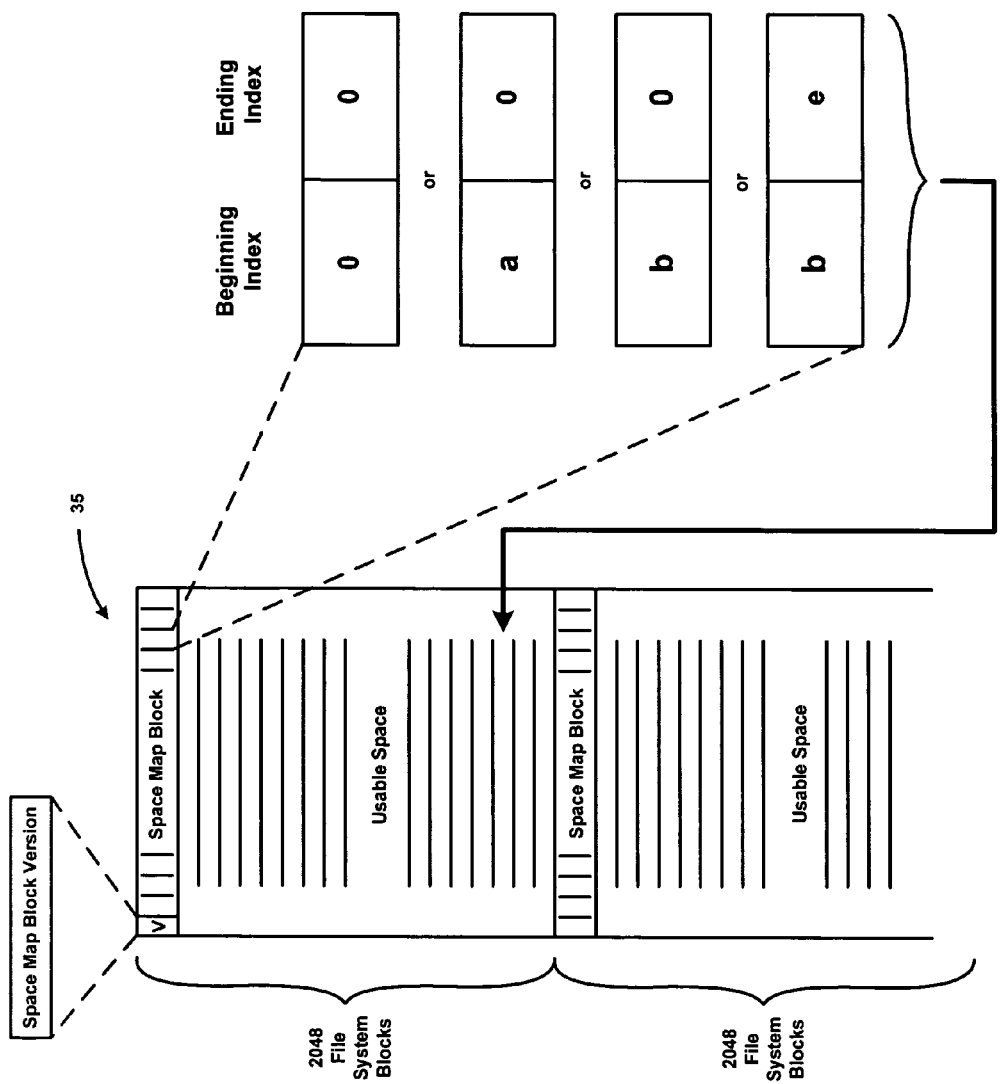
FIG. 25 illustrates the details of the space map blocks and a space map block version.

FIG. 25 illustrates the details of a space map block and its space map block version. The space map block version indicates the version of the file system from the index table (FIG. 3) that last modified the space map block. This permits the file system to identify space map blocks that have been modified.

Figure 26:
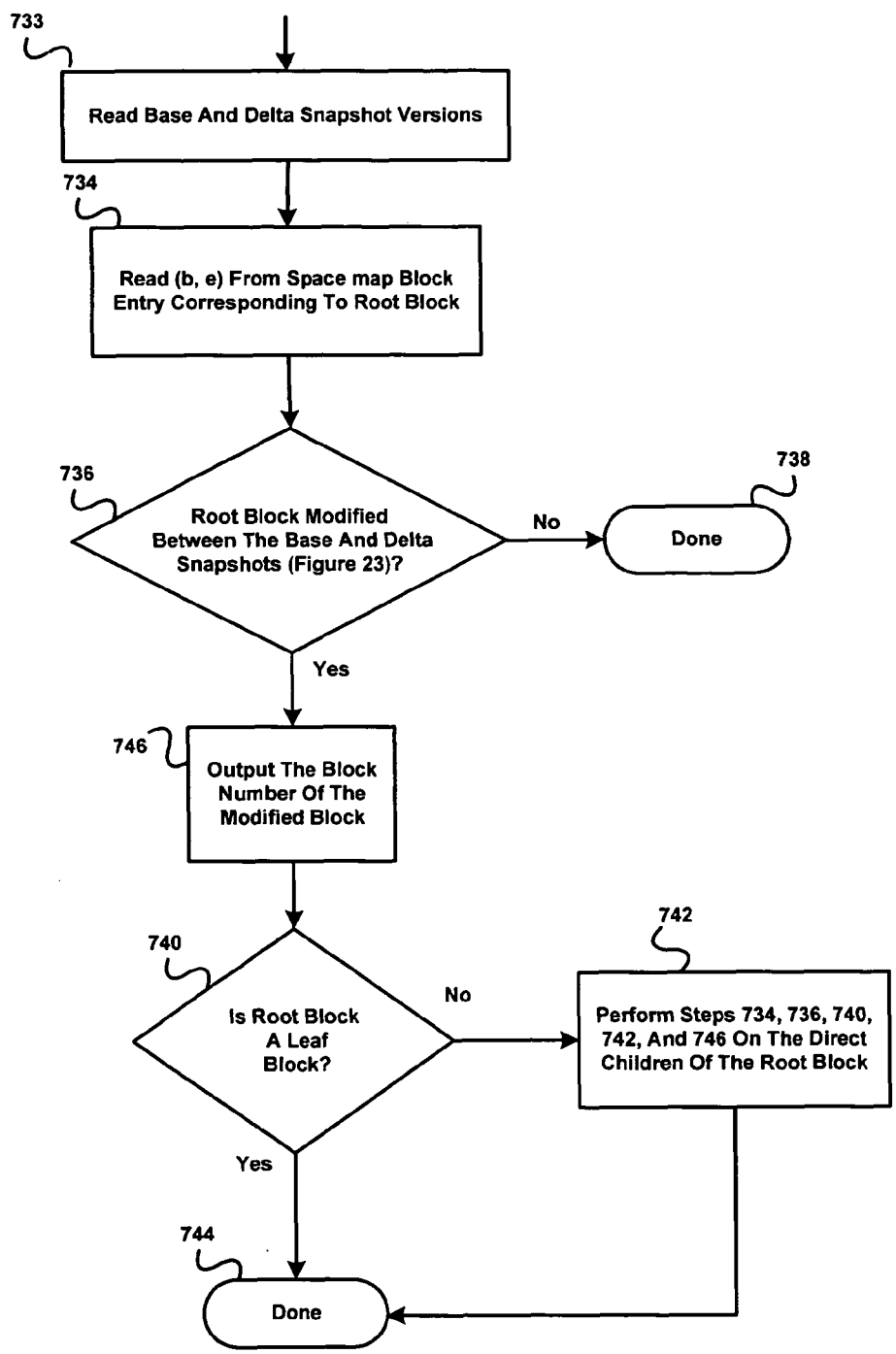
FIG. 26 illustrates a method for finding modified blocks between a base snapshot and delta snapshot by traversing a tree data structure.

FIG. 26 illustrates a method for finding modified blocks between a base snapshot and a delta snapshot in a file system by traversing a tree data structure such as a B-tree or radix tree. Cormen et al., *Introduction to Algorithms* (2003) describes B-trees at pages 434-454 and other suitable data structures and is incorporated by reference herein.

At step 733, the method reads the base snapshot and the delta snapshot versions. At step 734, the method reads (b, e) from the space map block entry that corresponds to the root block of the tree data structure.

At step 736, the method determines if the root block was modified between the base snapshot and the delta snapshot using the method of FIG. 23. If not, the method terminates at step 738. If so, the method outputs the block number of the modified block at step 746.

Next, the method proceeds to step 740 and determines if the root block is a leaf block (i.e., has no descendants). If so, the method terminates at step 744. If not, the method proceeds to step 742 where the method performs steps 734, 736, 740, 742, and 746 on the direct children of the root block.

FIGS. 27-31c illustrate methods for finding files, directories, and file blocks modified between a base snapshot and a delta snapshot.

Figure 27:
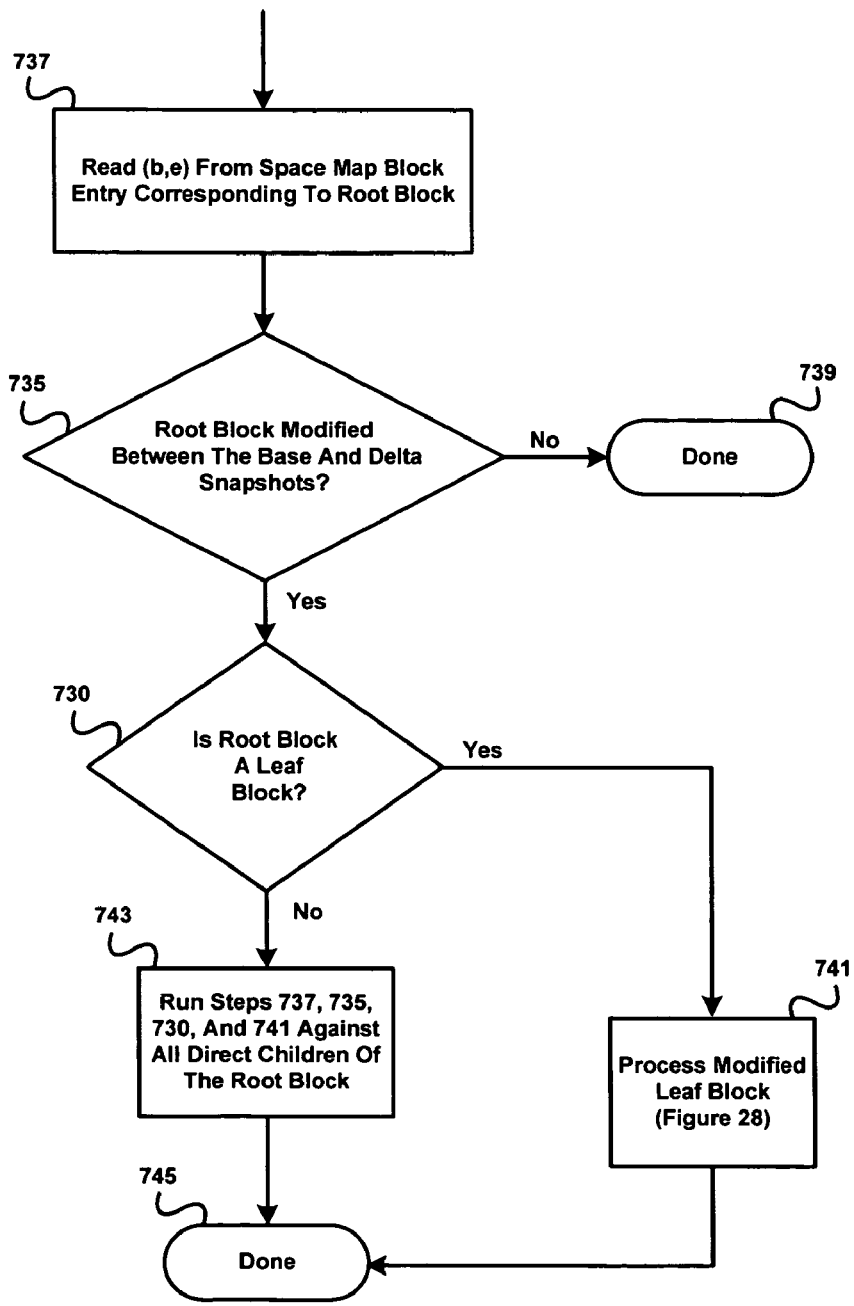
FIG. 27 shows another method for finding block modified between a base snapshot and a delta snapshot in a tree data structure.

FIG. 27 shows a method performed in a host for finding modified blocks on a data storage subsystem between a base and delta snapshot in a file system by navigating a tree data structure. Cormen et al., *Introduction to Algorithms* (2003) describes B-trees at pages 434-454, radix trees at pages 269-270, and is incorporated by reference herein.

At step 737, the method reads the space map block entry (b, e) corresponding to the root block of the tree data structure.

At step 735, the method determines if the root block was modified between the base snapshot and the delta snapshot using the method illustrated in FIG. 23. If not, the method is done at step 739.

If the root block was modified, the method proceeds to step 730. At step 730, the method determines if the root block is a leaf block (i.e., has no descendants). If not, the method proceeds to step 743 where it performs steps 737, 735, 730, and 741 against all direct children of the root block then terminates at step 745.

Figure 28:
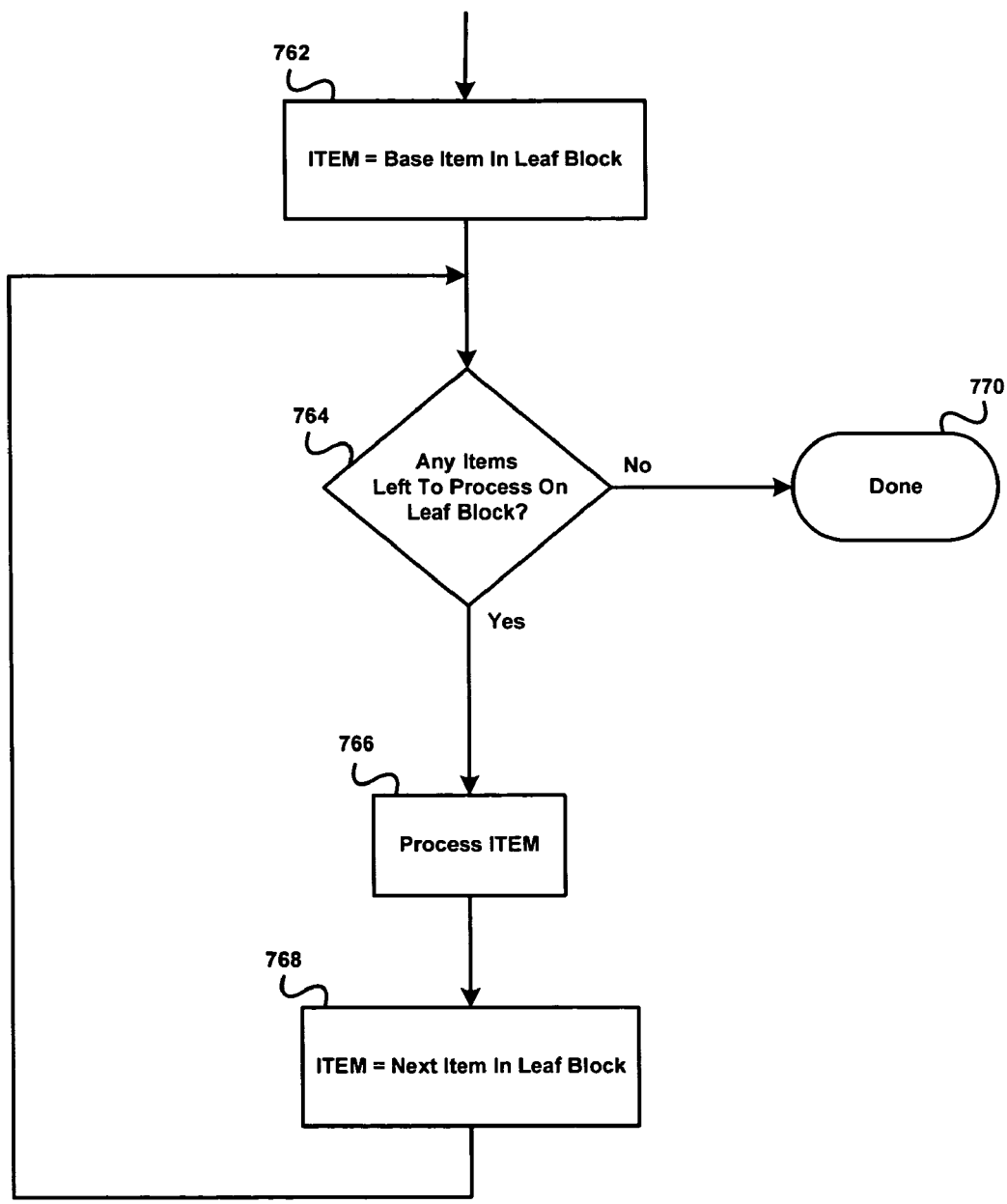
FIG. 28 illustrates a method for processing items in a leaf block of a B-tree data structure.

At step 730, if the method determines the root block is a leaf block, the method processes that modified block at step 741 as set forth in FIG. 28. The method terminates at step 745.

As a result, the method has identified the leaf blocks in the delta snapshot that have been modified since the base snapshot. These leaf blocks will be further processed by the methods illustrated in FIGS. 28-30 to determine what files and directories were modified.

FIG. 28 illustrates a method performed in a host for processing modifications of a leaf block of a B-tree data structure stored in a data storage subsystem. A leaf block contains a number of items. In an embodiment, an item is a key and data, where the data represents either a directory entry or an inode. Silberschatz et al., *Operating System Concepts* (2009) and pages 273-291 of Tanenbaum, *Modern Operating Systems* (2008) describe directories, inodes, and other details of file system implementation, which are incorporated by reference herein. At step 762, the method assigns the base item in the leaf block to a variable named ITEM. At step 764, the method tests if there are any items left to process on the leaf block, and if not, terminates at step 770. If so, the method processes the ITEM at step 766, then sets the variable ITEM to the next item in the leaf block at step 768 and returns to step 764.

Figure 29:
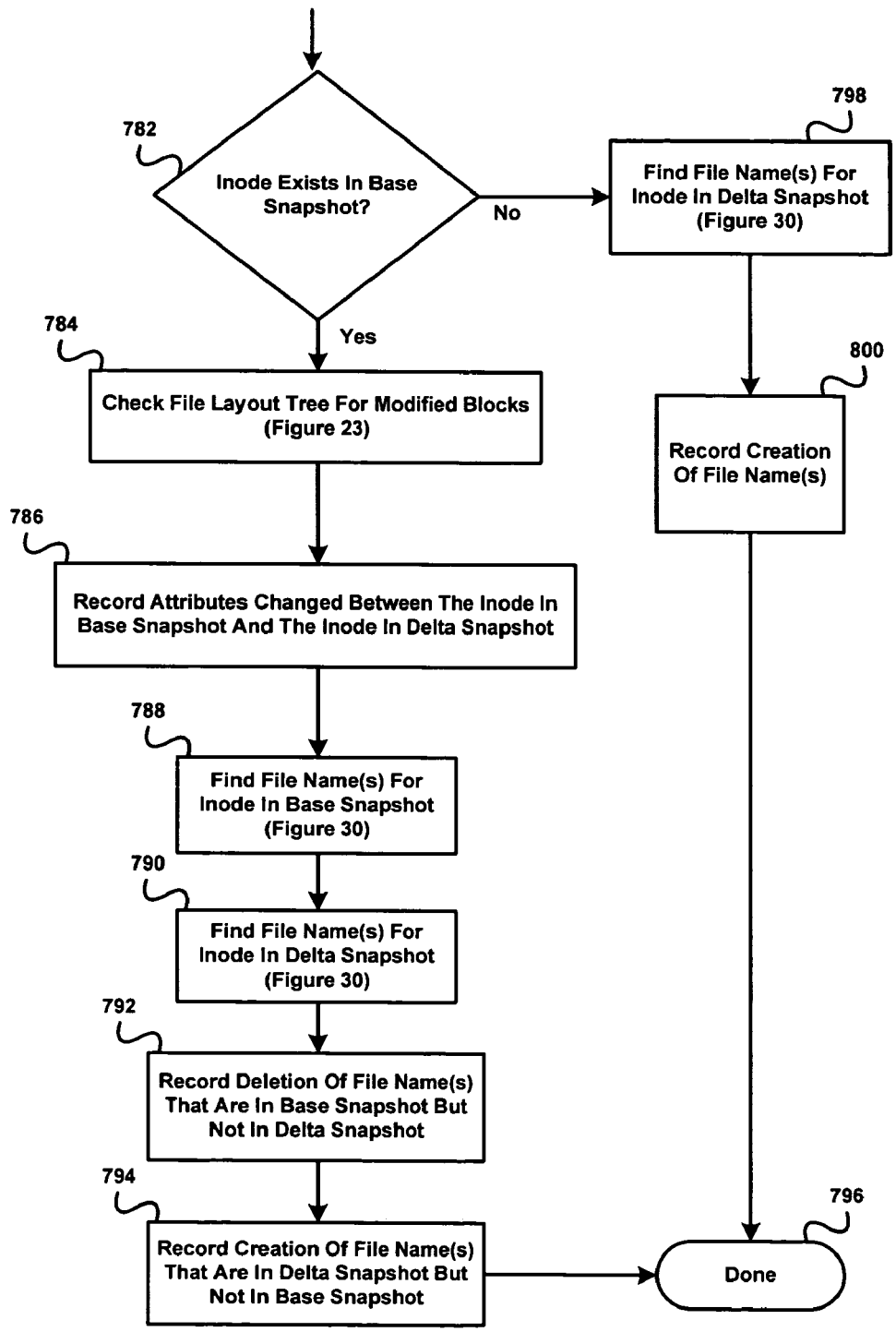
FIG. 29 illustrates a method for processing an inode in a leaf block.
Figure 30:
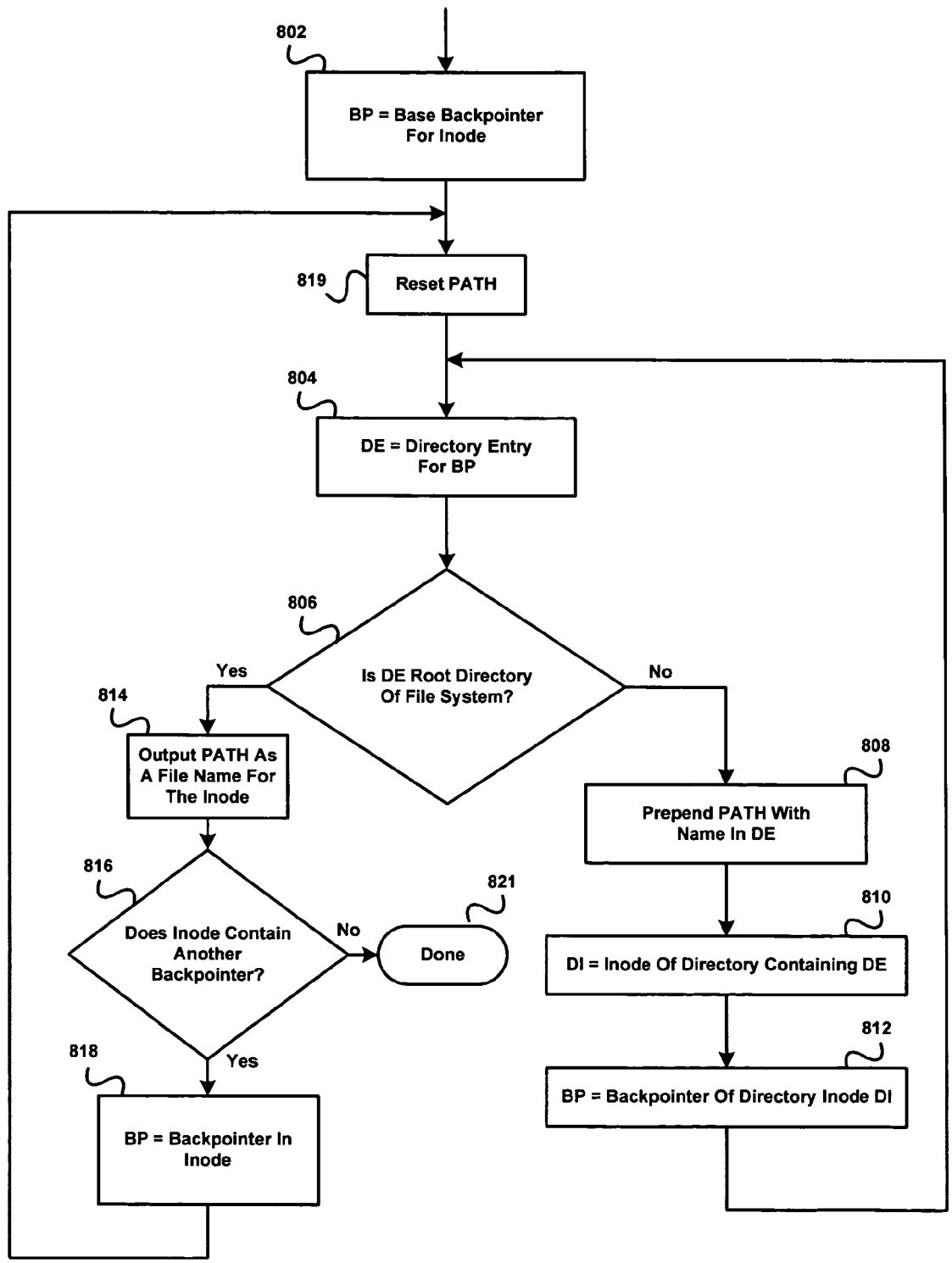
FIG. 30 illustrates a method for finding file names for an inode.

FIG. 29 illustrates a method performed in a host for processing an inode in a leaf block. At step 782, the method tests if an inode exists in a base snapshot. If not, the inode represents a new file in the delta snapshot so the method goes to step 798 where the method finds the file name for the inode in the delta snapshot as illustrated in FIG. 30. In an alternative embodiment, the method finds the files names for all the hard links to the inode at step 798. Tanenbaum, *Modern Operating Systems* (2008) at pages 283-285 describes the details of hard links, which is incorporated by reference herein.

At step 800, the method records the creation of file name(s). In an embodiment, the method records the creation of a single file name. In an alternative embodiment, the method records the creation of all the file names of a file where there are hard links to the file. At step 796, the method is done.

If an inode exists in the base snapshot, the method proceeds to step 784 to check the file layout tree for modified blocks by using the method set forth in FIG. 23. Tanenbaum, *Modern Operating Systems* (2008) describes the details of file layout trees in chapter 6, which is incorporated by reference herein. Cormen et al., *Introduction to Algorithms* (2003) describes details of a data structures suitable for use as file layout trees, such as a radix tree (chapter 12), a B-tree (chapter 18), as well as other tree data structures (chapters 10-13), which is incorporated by reference herein.

At step 786, the method records the attributes that changed between the inode in the base snapshot and the inode in the delta snapshot. At step 788, the method finds the file names for the inode in the base snapshot as set forth in FIG. 30. In the step 790, the method finds the file names for the inode in the delta snapshot as set forth in FIG. 30. At step 792, the method records deletion of file name(s) that are in the base snapshot but not in the delta snapshot. At step 794, the method records creation of file name(s) that are in the delta snapshot but not the base snapshot. The method is done at step 796.

FIG. 30 illustrates a method performed in a host for finding file name(s) that correspond to an inode as set forth in steps 788 and 790 of FIG. 29. In an embodiment, the method finds the file names for the inode of a file system by identifying and listing (i.e., enumerating) all the paths from the inode to the root directory of the file system using a depth-first search or a breadth-first search. Cormen et al., *Introduction to Algorithms* (2003) describes details of algorithms suitable for enumerating the paths such as pages 531-547, which is incorporated by reference herein.

In a file system, a directory entry points to an inode that describes the content of a file. The backpointers of an inode list the directory entries that point to the inode. Zhang et al., *Cross-Partition Protocols in a Distributed File Service* (2001) describes backpointers in detail, which is incorporated by reference herein.

At step 802, the method assigns a first backpointer for an inode to a variable BP. The method constructs file names for the inode in a variable called PATH. At step 819, the method resets the variable PATH to an empty string. At step 804, the method assigns the directory entry for the variable BP to a variable DE. At step 806, the method tests if directory entry DE is the root directory of the file system. If yes, the method outputs the string contained in the variable PATH for the file name of the inode at step 814. Next, at step 816, the method tests if the inode contains a next backpointer. If not, the method terminates at step 821.

If the inode contains another backpointer at step 818, the method assigns that backpointer in the inode to the variable BP then resumes processing at step 819.

If at step 806, the method determines that DE is not the root directory of the file system, the method proceeds to step 808 where it prepends PATH with the name in the directory entry DE. At step 810, the method assigns the inode of the directory containing directory entry DE to the variable DI. At step 812, the method assigns the backpointer of directory inode DI to the variable BP then resumes processing at step 804.

FIGS. 31a-31c illustrate the method of FIG. 24 performed in a host to find modified blocks by traversing a specific file system representation called a B-tree and a Radix tree. Cormen et al., *Introduction to Algorithms* (2003) describes B-trees at pages 434-454, radix trees at pages 269-270, and other suitable tree data structures and is incorporated by reference herein.

FIG. 31a illustrates a B-tree, a Radix tree, and uses bold to indicate the links that are traversed in the B-tree and the Radix tree.

As shown FIG. 31b, the host has taken snapshots m, n, p, q, and r with respect to time. The variable m represents the index of the base snapshot. The variable r represents the index of the delta snapshot. Each block has a space map block entry. The space map block entries for the blocks in the B-tree are shown in FIG. 31c.

As an example, the method can find any block modified between snapshot n and snapshot r. The method begins at root block 1 and checks its children (i.e., blocks 2, 3, and 4) as shown in FIG. 31a.

Referring to FIG. 31c, the space map block entry (m, 0) for block 2 indicates that the host allocated block 2 in the snapshot m and has not modified it. Likewise, the space map block entry (m, 0) of block 3 indicates the host has not modified block 3. However, the space map block entry (p, r) of block 4 indicates block 4 was modified after snapshot n. Thus, the host adds block 4 to a list of modified blocks.

Next, the host checks block 4 by examining the space map block entries of its children. The space map block entry (m, 0) for block 8 indicates that the host allocated block 8 in snapshot m and has not modified it. However, the space map block entry (q, r) of block 9 indicates that block 9 was modified after the snapshot n. Thus, the host adds block 9 to the list of modified blocks.

The host checks block 9 by examining the space map block entries of its children. The space map block entry (m, 0) for block 12 indicates that the host allocated block 12 in snapshot m and has not modified it. However, the space map block entry (r, r) of block 13 indicates that block 13 was modified after the snapshot n. Thus, the host adds block 13 to the list of modified blocks.

The host checks block 13 by examining the space map block entries of its children. The space map block entry (n, 0) for block 20 indicates that the host allocated block 20 in the snapshot n and has not modified it. However, the space map block entry (p, r) of block 21 indicates that block 21 was modified after the snapshot n. Thus, the host adds block 21 to the list of modified blocks. Block 21 is a leaf block, i.e., has no children.

What is claimed is:

1. A method for finding data block modified between a base snapshot and a delta snapshot of a file system stored in a memory of a host by navigating a tree data structure, comprising:
   (a) reading a space map block entry (b, e) corresponding to a root block;
   (b) determining if the root block was modified between the base snapshot and the delta snapshot;
   (c) if the root block was modified, outputting the block number of the modified root block; and
   (d) determining if the root block is a leaf block, and if not repeating steps (a), (b), (c), and (d) of the direct children of the root block.

2. The method of claim 1, wherein the base snapshot has a version and the delta snapshot has a version in an index table that indicate if the root block was modified between the base snapshot and the delta snapshot.

3. A method for processing a block modified between a base snapshot and a delta snapshot of a file system in memory of a host by navigating a tree data structure, comprising:
   (a) reading a space map block entry (b, e) corresponding to a root block;
   (b) determining if a root block was modified between a base snapshot version and a delta snapshot version; and
   (c) if the root block was modified, determining if the root block is a leaf block, and if so, processing the modified leaf block, and if not, repeating steps (a), (b), and (c) on all of the direct children of the root block.

4. The method of claim 3, wherein processing includes the host performing the following steps on each inode in the changed leaf block:
   (d) if the inode does not exist in the base snapshot, finding and recording creation of file names for the inode in the delta snapshot;
   (e) if the inode does exist in the base snapshot, performing the following steps:
      i. checking the file layout tree for modified blocks,
      ii. recording attributes changed between the inode in the base snapshot and the delta snapshot,
      iii. recording deleted file names for the inode, and
      iv. recording created file names for the inode.

5. A method of processing an inode of a leaf block of a tree data structure, wherein the inode is part of a file system stored in memory of a host, comprising:
   (a) determining if an inode exists in a base snapshot:
      i. if not, finding file names for the inode in a delta snapshot and creating a record of the file(s), and
      ii. if so, performing the following steps:
   (b) checking a file layout tree for modified blocks;
   (c) comparing inodes in the base snapshot and the delta snapshot for changed attributes;
   (d) finding file names for the inode in the base snapshot;
   (e) finding file names for the inode in the delta snapshot;
   (f) recording the deleted file names in the base snapshot that are not in the delta snapshot; and
   (g) recording the created file names in the delta snapshot that are not in the base snapshot.

6. The method of claim 5, wherein finding the file names for the inode of a file system includes enumerating all the paths from the inode to the root directory of the file system.

7. The method of claim 6, wherein enumerating all the paths from the inode to the root of the file system:
   (h) assigning a base backpointer for an inode in a variable BP;
   (i) initializing a variable PATH to a null value;
   (j) assigning a directory entry for the variable BP in a variable DE;
   (k) determining if the variable DE is root directory of the file system, and if not, performing the following steps:
      i. prepending the variable PATH with name in the variable DE,
      ii. assigning the inode containing the variable DE in a variable DI,
      iii. assigning the base backpointer of the variable DI to the variable BP, and repeating steps (i), (j), and (k), and if so, performing the following steps:
      iv. outputting the variable PATH; and
      v. determining if the inode has a next backpointer, and if so, assigning the next backpointer in the inode to the variable BP, and repeating steps (i), (j), and (k).

8. A method of searching for blocks modified after a base snapshot and before a delta snapshot in a file system, comprising:
   (a) reading a base snapshot version;
   (b) reading a delta snapshot version;
   (c) reading a space map block entry (b, e) corresponding to the root block;
   (d) reading versions corresponding to (b, e) in an index table;
   (e) determining whether or not the root block was modified since the base snapshot and if not modified, truncating the search for modified blocks that are descendants of the root block and if modified, determining the root block is modified; and (f) determining whether or not the root block is a leaf block and if not, repeating steps (c)-(f) on all of the direct descendants of the root block.

9. The method of claim 8, wherein at step (e) determining the root block was modified includes determining that the version of e is greater than or equal to the delta snapshot version, the version of b is less than or equal to the delta snapshot version, and the version of b is greater than the base snapshot version.

10. The method of claim 8, wherein after determining the root block is modified at step (e) outputting the root block to a list of modified blocks.

* * * * *